(12) United States Patent
Shirado et al.

(10) Patent No.: US 10,536,655 B2
(45) Date of Patent: Jan. 14, 2020

(54) PHOTOELECTRIC CONVERSION DEVICE, IMAGE FORMING APPARATUS, PHOTOELECTRIC CONVERSION METHOD, AND NON-TRANSITORY RECORDING MEDIUM

(71) Applicants: Hiroki Shirado, Kanagawa (JP); Masamoto Nakazawa, Kanagawa (JP); Masayuki Yabuuchi, Kanagawa (JP)

(72) Inventors: Hiroki Shirado, Kanagawa (JP); Masamoto Nakazawa, Kanagawa (JP); Masayuki Yabuuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/790,101

(22) Filed: Oct. 23, 2017

(65) Prior Publication Data

US 2018/0146150 A1 May 24, 2018

(30) Foreign Application Priority Data

Nov. 24, 2016 (JP) .................................. 2016-228370

(51) Int. Cl.
 *H04N 5/367* (2011.01)
 *H04N 5/217* (2011.01)
(52) U.S. Cl.
 CPC ........... *H04N 5/367* (2013.01); *H04N 5/2173* (2013.01); *H04N 2201/04787* (2013.01)
(58) Field of Classification Search
 CPC .................................................... H04N 5/367
 (Continued)

(56) References Cited

U.S. PATENT DOCUMENTS

| 2003/0072501 | A1* | 4/2003 | Enomoto | ............. | H04N 1/4097 382/311 |
| 2006/0197854 | A1* | 9/2006 | Kubo | ................. | H04N 5/23245 348/246 |

(Continued)

FOREIGN PATENT DOCUMENTS

| JP | 6-205302 | 7/1994 |
| JP | 2002-223391 | 8/2002 |

(Continued)

OTHER PUBLICATIONS

U.S. Appl. No. 15/485,323, filed Apr. 12, 2017, Tomohiro Sasa, et al.
U.S. Appl. No. 15/600,156, filed May 19, 2017, Naoki Goh, et al.

*Primary Examiner* — Joel W Fosselman
(74) *Attorney, Agent, or Firm* — Oblon, McClelland, Maier & Neustadt, L.L.P.

(57) ABSTRACT

A photoelectric conversion device having plural photoelectric conversion pixels includes an imaging unit, a position identifying unit, an interpolation determining unit, and an interpolation processing unit. The imaging unit generates image data for each of plural colors based on light received in the photoelectric conversion pixels. The position identifying unit detects in the photoelectric conversion pixels a defective pixel outputting an electrical signal at an abnormal level, and stores position information of the defective pixel. The interpolation deter mining unit determines, based on respective pixel values of peripheral pixels peripheral to the defective pixel, whether to perform an interpolation process on the defective pixel. The interpolation processing unit performs the interpolation process on the defective pixel when the interpolation determining unit determines to perform the interpolation process on the defective pixel. The interpolation process approximates the electrical signal of the defective pixel to an electrical signal at a normal level.

17 Claims, 17 Drawing Sheets

(58) Field of Classification Search
USPC .......................................................... 348/246
See application file for complete search history.

(56) References Cited

U.S. PATENT DOCUMENTS

| | | |
|---|---|---|
| 2007/0188638 A1 | 8/2007 | Nakazawa et al. |
| 2008/0252787 A1 | 10/2008 | Nakazawa et al. |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0032393 A1* | 2/2011 | Yamaguchi ............ H04N 5/367 348/247 |
| 2011/0051201 A1 | 3/2011 | Hashimoto et al. |
| 2011/0063488 A1 | 3/2011 | Nakazawa |
| 2012/0057211 A1 | 3/2012 | Shirado |
| 2012/0154646 A1* | 6/2012 | Sai ..................... H04N 5/367 348/246 |
| 2013/0063792 A1 | 3/2013 | Nakazawa |
| 2014/0043629 A1 | 2/2014 | Shirado |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0219163 A1 | 7/2016 | Shirado et al. |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0244853 A1 | 8/2017 | Yabuuchi et al. |
| 2017/0295298 A1 | 10/2017 | Ozaki et al. |

FOREIGN PATENT DOCUMENTS

| | | |
|---|---|---|
| JP | 2002-247352 | 8/2002 |
| JP | 2005-318337 | 11/2005 |
| JP | 2012-105063 | 5/2012 |
| JP | 2013-186560 | 9/2013 |

* cited by examiner

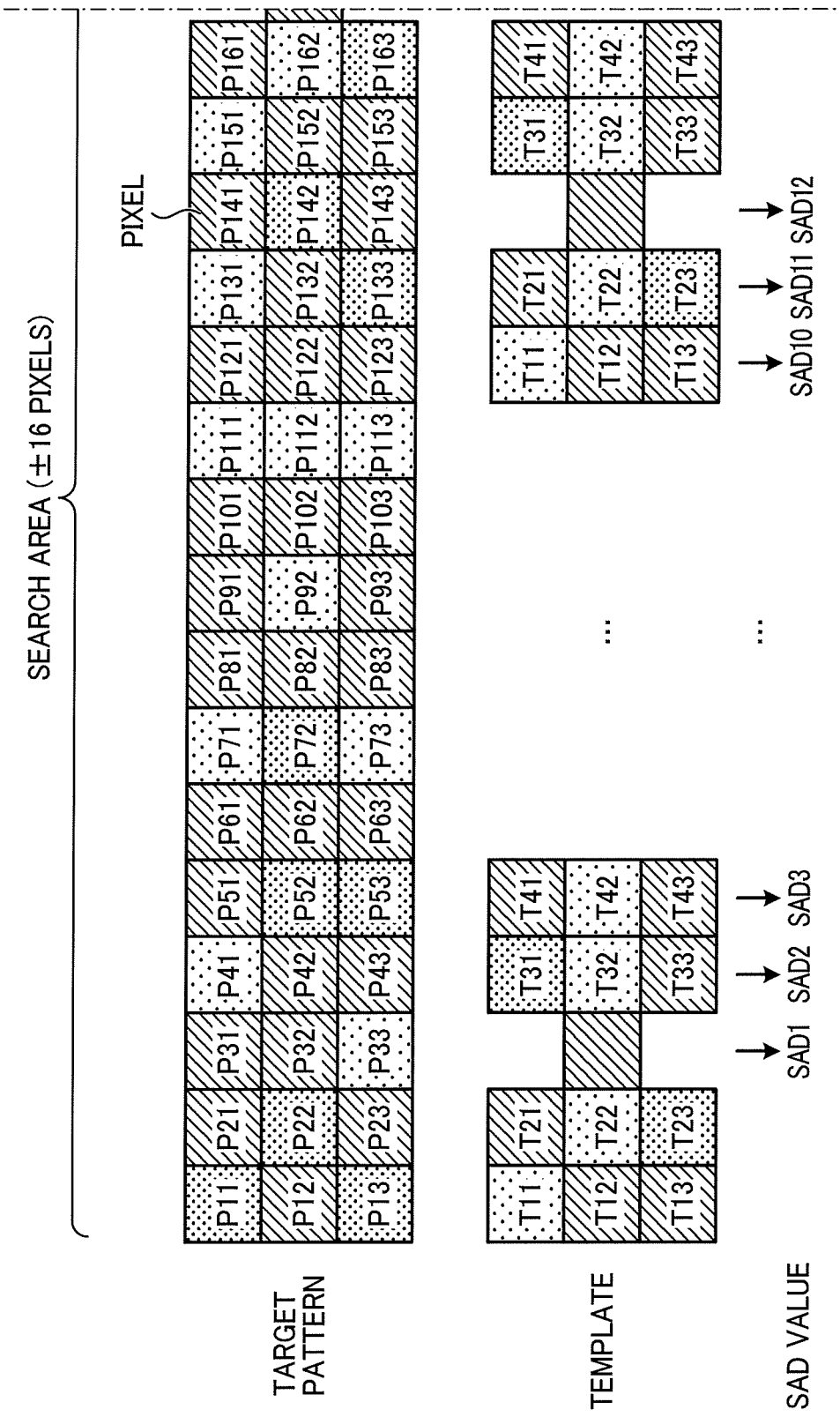

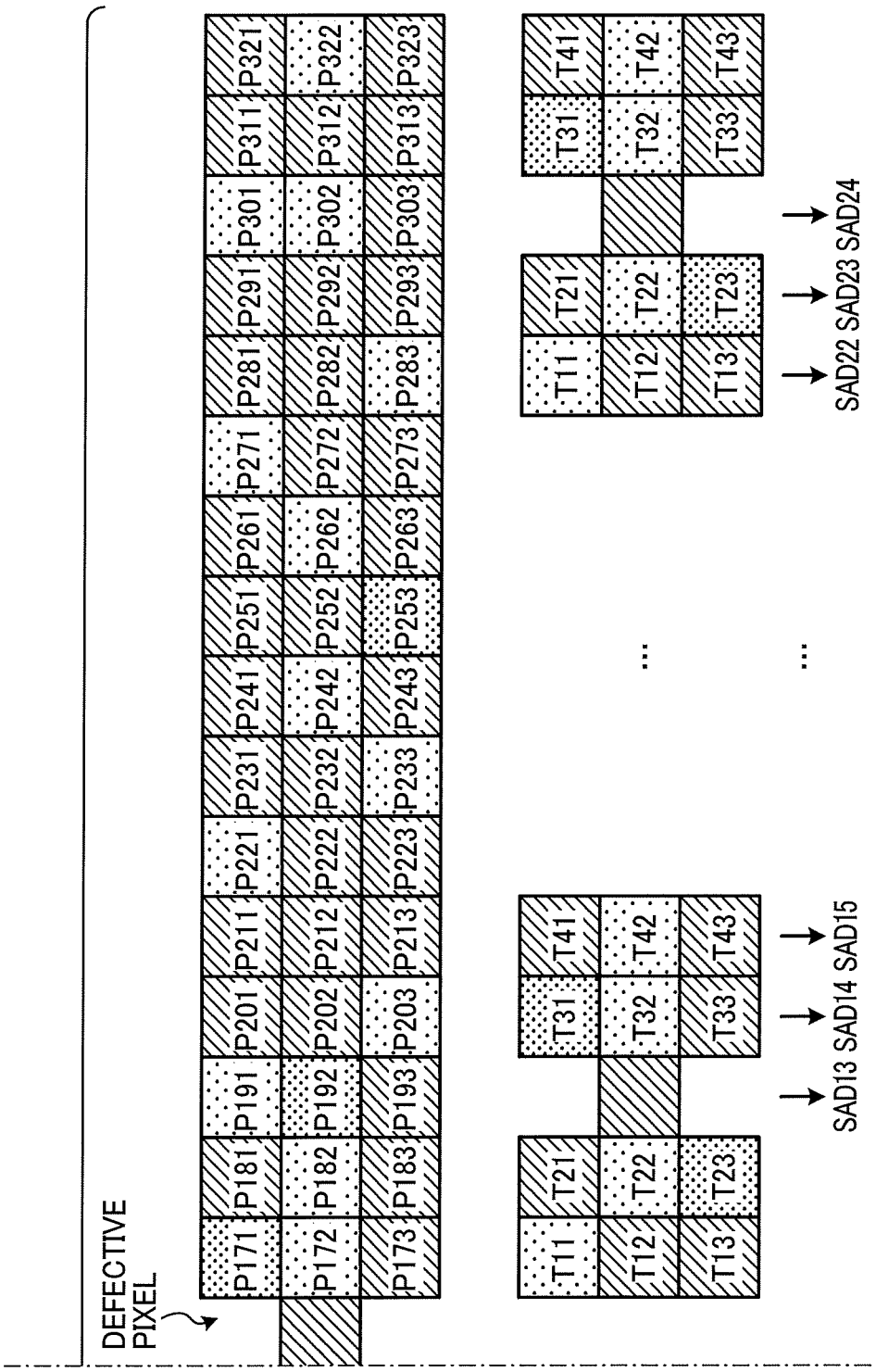

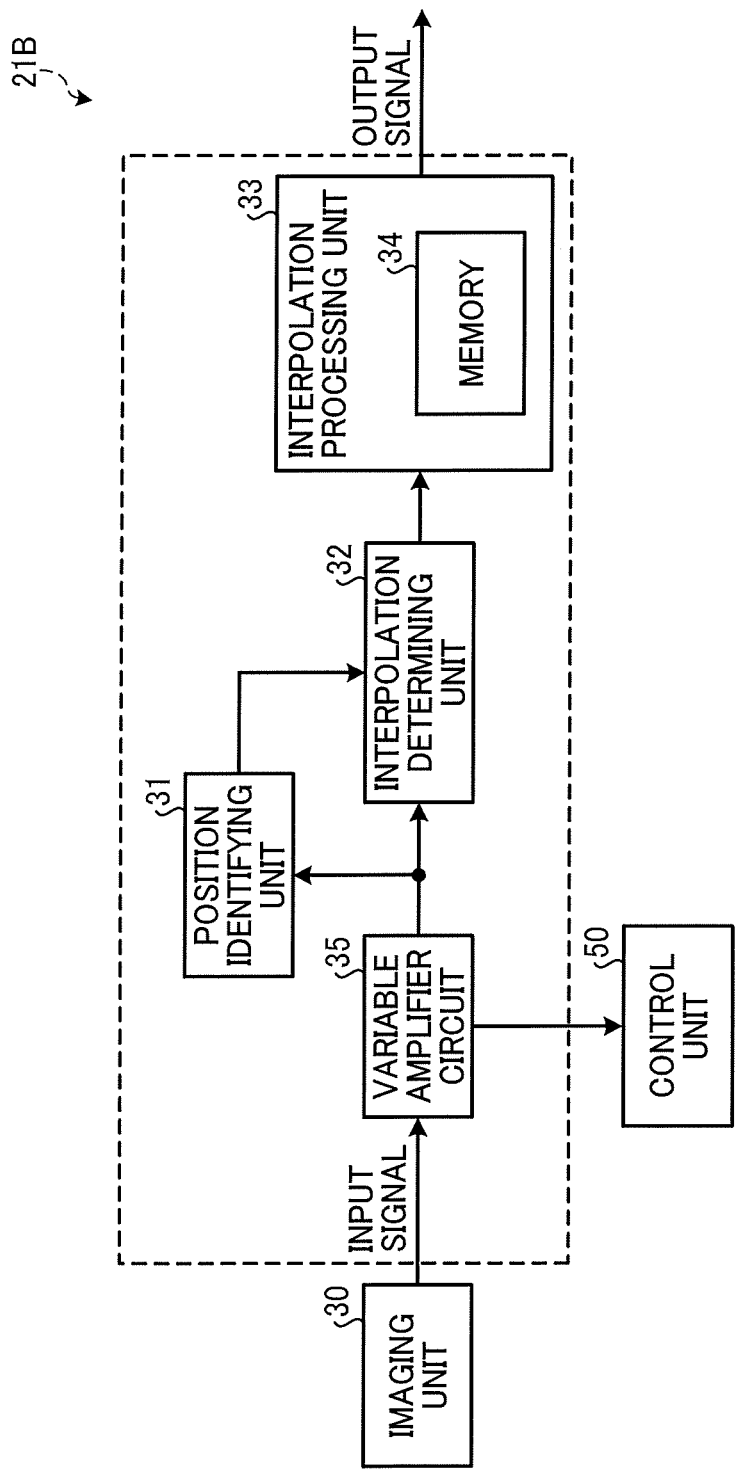

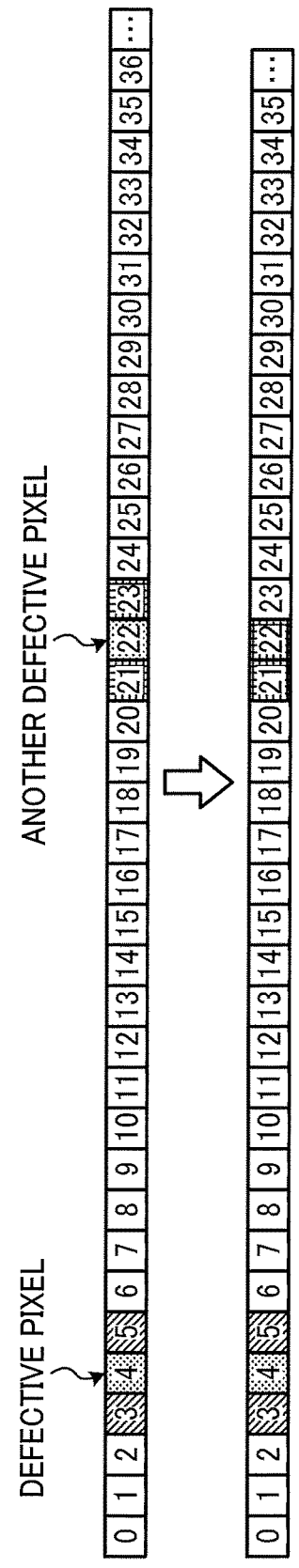

PHOTOELECTRIC CONVERSION DEVICE, IMAGE FORMING APPARATUS, PHOTOELECTRIC CONVERSION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2016-228370 filed on Nov. 24, 2016, in the Japan Patent Office, the entire disclosure of which is hereby incorporated by reference herein.

BACKGROUND

Technical Field

The present invention relates to a photoelectric conversion device, an image forming apparatus, a photoelectric conversion method, and a non-transitory recording medium.

Description of the Related Art

An interpolation process has been known in which abnormal image data generated in a defective pixel in an imaging device is interpolated with image data of pixels peripheral to the defective pixel. For example, to reduce random telegraph signal (RTS) noise in an image, an image processing device may perform the interpolation process on a target pixel if the noise amount of the target pixel exceeds the mean shot noise amount of pixels peripheral to the target pixel.

If the defective pixel corresponds to an edge portion of a fine line forming a character or the like or an edge portion of a pattern, however, the interpolation process may replace the value of the defective pixel with an incorrect value, failing to eliminate the influence of the defective pixel on the image.

SUMMARY

In one embodiment of this invention, there is provided an improved photoelectric conversion device having a plurality of photoelectric conversion pixels. The photoelectric conversion device includes, for example, an imaging unit, a position identifying unit, an interpolation determining unit, and an interpolation processing unit. The imaging unit generates image data for each of a plurality of colors based on light received in the plurality of photoelectric conversion pixels. The position identifying unit detects in the plurality of photoelectric conversion pixels a defective pixel outputting an electrical signal at an abnormal level, and stores position information of the defective pixel. The interpolation determining unit determines, based on respective pixel values of peripheral pixels peripheral to the defective pixel, whether to perform an interpolation process on the defective pixel. The interpolation processing unit performs the interpolation process on the defective pixel when the interpolation determining unit determines to perform the interpolation process on the defective pixel. The interpolation process approximates the electrical signal of the defective pixel to an electrical signal at a normal level.

In one embodiment of this invention, there is provided an improved image forming apparatus that includes, for example, the above-described photoelectric conversion device to receive light reflected by a document placed on a document table.

In one embodiment of this invention, there is provided an improved photoelectric conversion method executed by a photoelectric conversion device having a plurality of photoelectric conversion pixels. The photoelectric conversion method includes, for example, generating image data for each of a plurality of colors based on light received in the plurality of photoelectric conversion pixels, detecting in the plurality of photoelectric conversion pixels a defective pixel outputting an electrical signal at an abnormal level, storing position information of the defective pixel, determining, based on respective pixel values of peripheral pixels peripheral to the defective pixel, whether to perform an interpolation process on the defective pixel, and performing the interpolation process on the defective pixel when the determining determines to perform the interpolation process on the defective pixel. The interpolation process approximates the electrical signal of the defective pixel to an electrical signal at a normal level.

In one embodiment of this invention, there is provided a non-transitory recording medium storing a program for causing a photoelectric conversion device having a plurality of photoelectric conversion pixels to execute the above-described photoelectric conversion method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 11A and 11B are diagrams illustrating an operation of calculating sum of absolute difference (SAD) values while moving a template in a target pattern;

FIG. 14 is a block diagram of a photoelectric conversion unit included in the MFP according to a fourth embodiment of the present invention;

FIG. 15 is a diagram illustrating a summary of an interpolation process according to a fifth embodiment of the present invention;

FIG. 16 is a diagram illustrating a summary of an interpolation process according to a sixth embodiment of the present invention;

Figure 1:
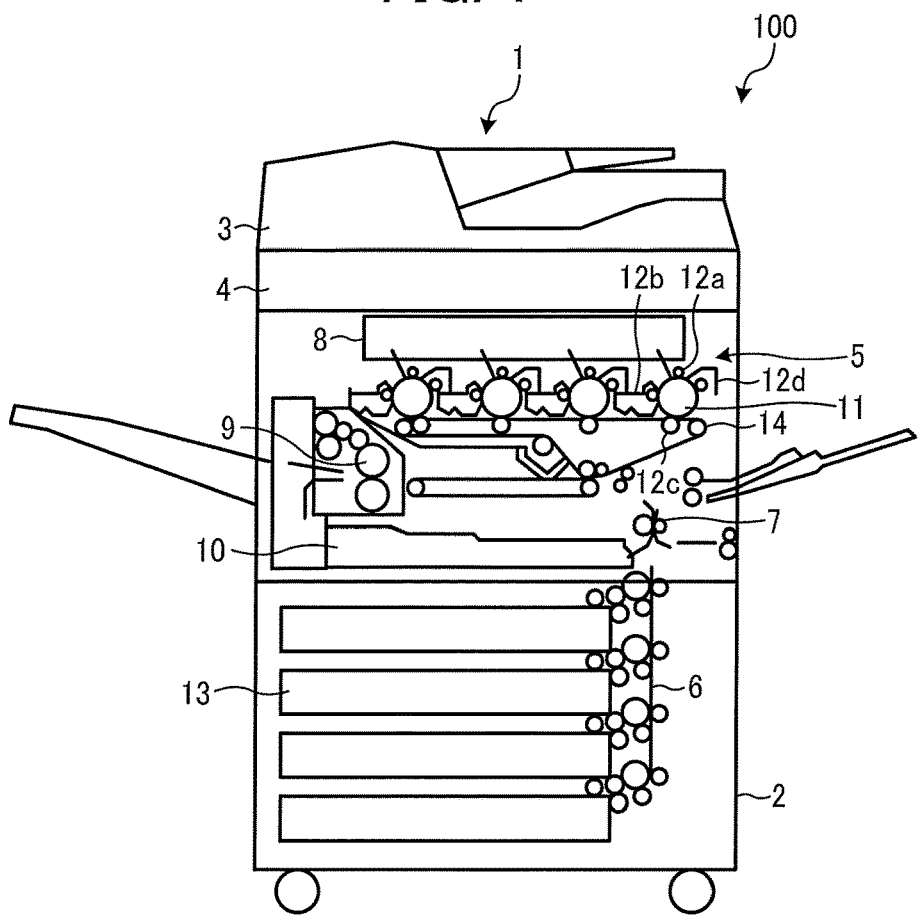
FIG. 1 is a longitudinal sectional view of a multifunction peripheral (MFP) according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the accompanying drawings, wherein like reference numerals designate identical or corresponding parts throughout the several views, embodiments of the present invention will be described.

A photoelectric conversion device and a photoelectric conversion method according to an embodiment of the present invention are applicable to a device that reads an image and a device that senses the presence or absence of light and performs predetermined information processing, specifically devices such as a linear sensor of a multifunction peripheral (MFP), a line sensor for contrast autofocus (AF) of a camera or a video camera, and a line sensor for reading a character, sign, or figure written on an interactive electronic whiteboard. The following description will be given of an example of an MFP applied with a photoelectric conversion device, a photoelectric conversion method, and an image forming apparatus according to an embodiment of the present invention.

A first embodiment of the present invention will be described. A configuration of an MFP 100 according to the first embodiment will first be described.

FIG. 1 illustrates the MFP 100 according to the first embodiment, as viewed from a side of the MFP 100. In FIG. 1, a main body 2 of the MFP 100 is seen through. As illustrated in FIG. 1, the MFP 100 includes a reading device 1 and the main body 2. The reading device 1 includes an automatic document feeder (ADF) 3 and a scanner mechanism 4.

The main body 2 includes an image forming unit 5 employing a tandem system, registration rollers 7 that supply a recording sheet to the image forming unit 5 from one of sheet feeding units 13 via a transport path 6, an optical writing device 8, a fixing and transporting unit 9, and a duplex tray 10. The image forming unit 5 includes four photoconductor drums 11 corresponding to four colors: yellow (Y), magenta (M), cyan (C), and black (K). Each of the photoconductor drums 11 is surrounded by image forming components, such as a charger 12a, a developing device 12b, a transfer device 12c, a cleaner 12d, and a discharger. In FIG. 1, only the rightmost one of the photoconductor drums 11 is assigned with reference numerals for clarity of illustration. Further, an intermediate transfer belt 14 is held in a nip between the transfer devices 12c and the photoconductor drums 11, while being stretched between a drive roller and a driven roller.

In the MFP 100 thus configured as an image forming apparatus employing the tandem system, the optical writing device 8 performs optical writing on the photoconductor drums 11 for the YMCK colors to form thereon latent images. Then, the developing devices 12b develop the latent images with toners of the YMCK colors to form toner images. The toner images are then first-transferred onto the intermediate transfer belt 14 in the order of Y, M, C, and K, for example, to form a full-color image having the toner images of the four colors superimposed upon each other. The full-color image is then second-transferred onto the recording sheet and fixed thereon by the fixing and transporting unit 9. Thereafter, the recording sheet is ejected to the outside of the MFP 100. Thereby, the full-color image is formed on the recording sheet.

A configuration of the ADF 3 and the scanner mechanism 4 will now be described.

Figure 2:
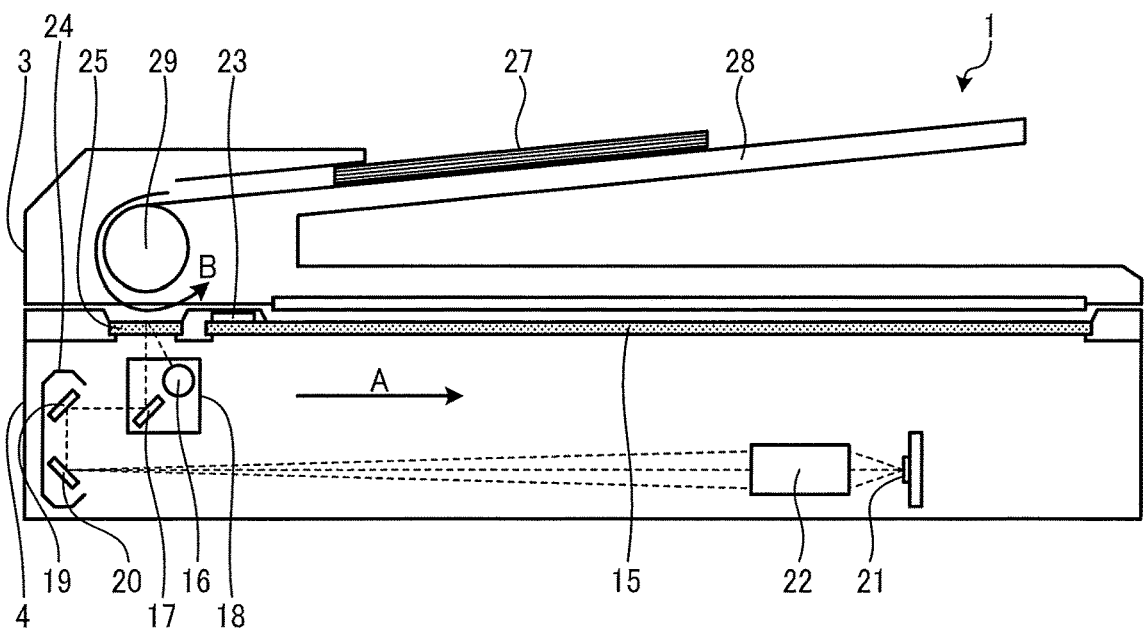
FIG. 2 is a longitudinal sectional view of a reading device included in the MFP according to the first embodiment.

FIG. 2 is a longitudinal sectional view of the ADF 3 and the scanner mechanism 4. The scanner mechanism 4 includes a contact glass 15, a first carriage 18, a second carriage 24, a photoelectric conversion unit 21, a lens unit 22, a reference white board 23, and a sheet-through reading slit 25.

The contact glass 15 has an upper surface to hold a document placed thereon. The first carriage 18 includes a light source 16 for exposing the document to light and a first reflecting mirror 17. The second carriage 24 includes a second reflecting mirror 19 and a third reflecting mirror 20. The lens unit 22 directs light reflected by the third reflecting mirror 20 onto a light receiving area of the photoelectric conversion unit 21 to form an image on the light receiving area. The reference white board 23 is used to correct various distortions caused by an optical reading system, for example. In the scanner mechanism 4, illuminating light emitted from the light source 16 is reflected by the document and received and converted by the photoelectric conversion unit 21 into electrical signals (i.e., image data) to be output.

The ADF 3 is joined to the main body 2 with members such as hinges to be opened and closed relative to the contact glass 15. The ADF 3 includes a document tray 28 to hold a document bundle 27 of a plurality of documents placed thereon. The ADF 3 further includes a separating and feeding unit including a feeding roller 29 that separates the documents one by one from the document bundle 27 placed on the document tray 28 and automatically feeds the documents toward the sheet-through reading slit 25.

A document reading operation of the reading device 1 will be described.

The reading device 1 configured as described above operates in a scan mode or a sheet-through mode. In the scan mode, the reading device 1 reads a document placed on the contact glass 15. In the sheet-through mode, the reading device 1 reads a document automatically fed by the ADF 3. Before image reading in the scan mode or the sheet-through mode, the light source 16 is turned on to illuminate the reference white board 23. Then, the photoelectric conversion unit 21 reads the image based on the reflected light. To equalize the levels of pixels in one line of image data, shading correction data is generated and stored. The stored shading correction data is used in shading correction of the image data read in the scan mode or the sheet-through mode.

In the scan mode, the first carriage 18 and the second carriage 24 are driven by a stepping motor to move in a sub-scanning direction indicated by arrow A to scan the document. In this process, the second carriage 24 moves at a speed half that of the first carriage 18 to maintain a constant optical path length from the contact glass 15 to the light receiving area of the photoelectric conversion unit 21.

At the same time, the light source 16 of the first carriage 18 illuminates an image surface, i.e., a lower surface of the document placed on the contact glass 15 to expose the image surface to light. Then, the light is sequentially reflected by the image surface of the document, the first reflecting mirror 17 of the first carriage 18, and the second reflecting mirror 19 and the third reflecting mirror 20 of the second carriage 24. Then, the beam of light reflected by the third reflecting mirror 20 is condensed by the lens unit 22 to form an image on the light receiving area of the photoelectric conversion unit 21. The photoelectric conversion unit 21 performs photoelectric conversion on the light received for each line to thereby generate image data. The image data is then digitized, adjusted in gain, and output.

In the sheet-through mode, the first carriage 18 and the second carriage 24 move to and stop at respective positions below the sheet-through reading slit 25. Thereafter, the documents of the document bundle 27 placed on the document tray 28 of the ADF 3 are sequentially and automatically fed by the feeding roller 29 in the sub-scanning direction indicated by arrow B from the lowest one of the documents of the document bundle 27. Each of the documents is scanned when passing through the sheet-through reading slit 25.

In this process, the light source 16 of the first carriage 18 illuminates the image surface (i.e., lower surface) of the automatically-fed document. Then, similarly as in the scan mode, the light is sequentially reflected by the image surface of the document, the first reflecting mirror 17 of the first carriage 18, and the second reflecting mirror 19 and the third reflecting mirror 20 of the second carriage 24, and is condensed by the lens unit 22 to form an image on the light receiving area of the photoelectric conversion unit 21. The photoelectric conversion unit 21 performs photoelectric conversion on the light received for each line to generate image data, which is then digitized, adjusted in gain, and output. The document subjected to the image reading is ejected to a sheet ejection port.

A description will now be given of random telegraph signal (RTS) noise due to a deficit pixel, specifically the RTS noise occurring when the photoelectric conversion unit 21 has a defect pixel. The photoelectric conversion unit 21 includes a semiconductor imaging device, such as a charge coupled device (CCD) image sensor or a complementary metal oxide semiconductor (CMOS) image sensor, for example. In such a photoelectric conversion unit 21, if one of carriers moving through the channel of a metal oxide semiconductor (MOS) transistor is trapped at a trap level in a gate insulating film, for example, the output level substantially fluctuates, causing the RTS noise in the image.

Figure 3A:
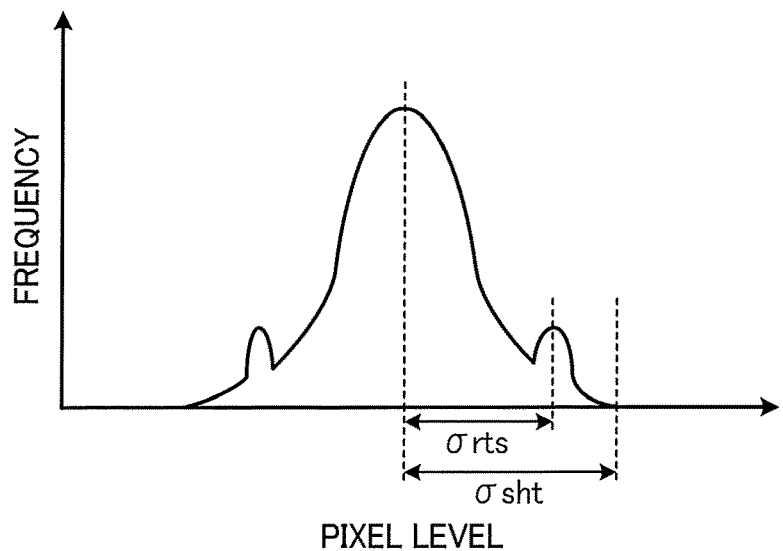
FIG. 3A is a graph illustrating the relationship between the frequency and the pixel level.

As illustrated in the graph of FIG. 3A, the fluctuation of the output level causes small peaks in the distribution at levels away from the mean of pixel values by a certain distance in the positive direction and the negative direction, respectively. The certain distance increases with an increase in an RTS noise amount σrts of the defective pixel.

In the case of an area sensor, the caused RTS noise appears as spots in frame images. The thus-appearing RTS noise has a low level in each of the frames, and changes at random. The RTS noise caused in the area sensor is therefore not very conspicuous in the image.

Figure 3B:
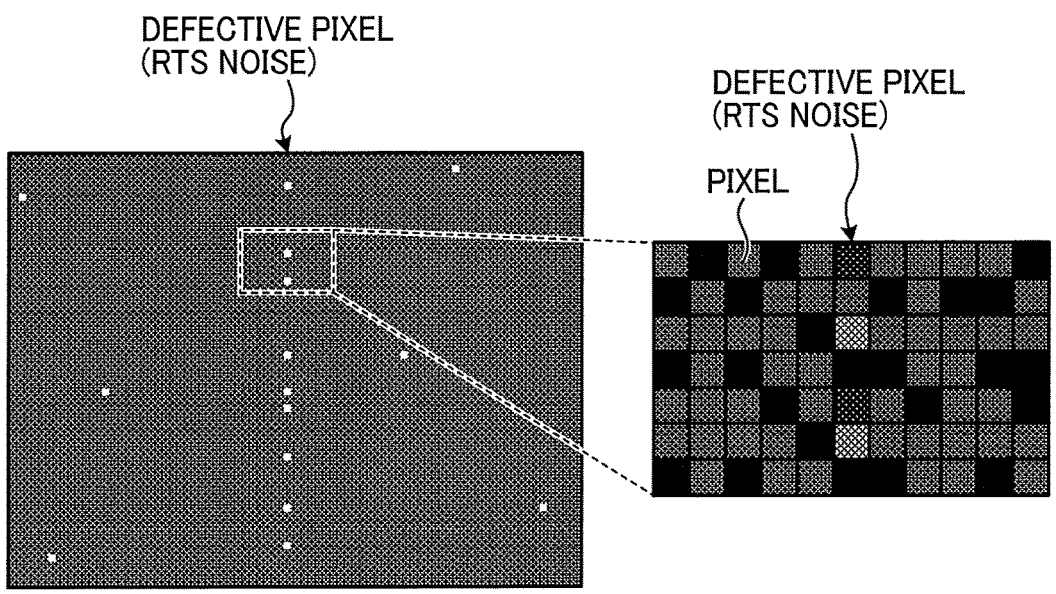
FIG. 3B is a diagram illustrating random telegraph signal (RTS) noise appearing in an image owing to a defective pixel in a linear sensor.

In the case of a linear sensor including photoelectric conversion elements for one row or multiple rows of pixels, on the other hand, the RTS noise of the defective pixel appears in frame images as changes in the level of vertically aligned dots, as illustrated in FIG. 3B. Further, even if the RTS noise amount σrts of the defective pixel falls within a normal noise distribution range corresponding to a mean shot noise amount σsht of peripheral pixels peripheral to the defective pixel, as illustrated in FIG. 3A, the change due to the RTS noise occurs in the same pixel. Consequently, the RTS noise appears in the form of a vertical line in a still image.

Such RTS noise occurs in a single color (i.e., individually occurs in each of MOS transistors for the respective colors) in accordance with the configuration of the MOS transistor for each of the pixels in the photoelectric conversion unit 21, or occurs at the same position in all color channels (i.e., occurs in a MOS transistor shared by all of the colors in a column configuration, for example).

A description will be given of the influence of the defective pixel on the image when there is a contrast between peripheral pixels of the defective pixel.

Figure 4A:
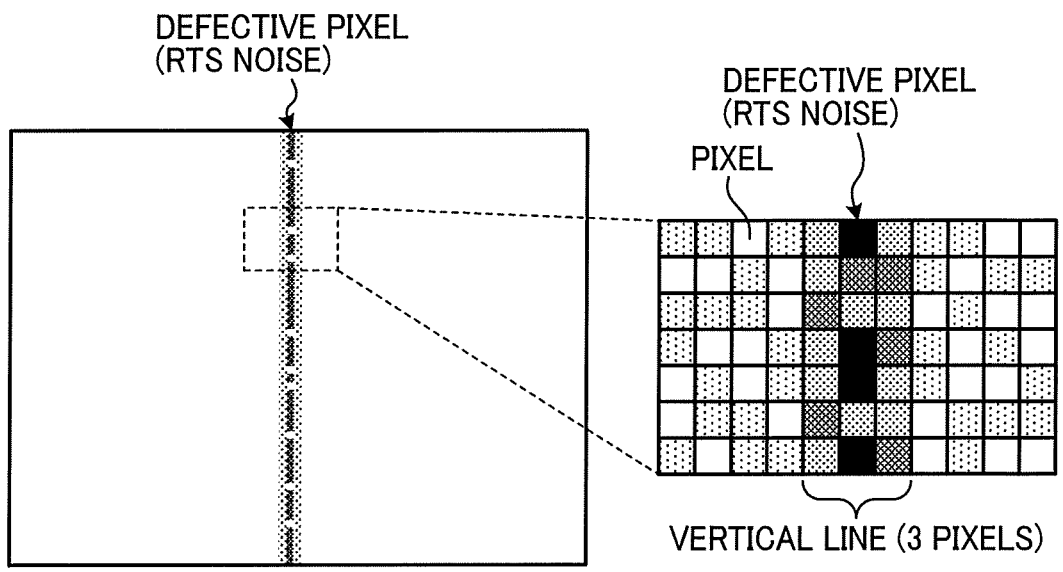
FIGS. 4A and 4B are diagrams illustrating how the defective pixel appears in the image when there is a contrast between peripheral pixels of the defective pixel.
Figure 4B:
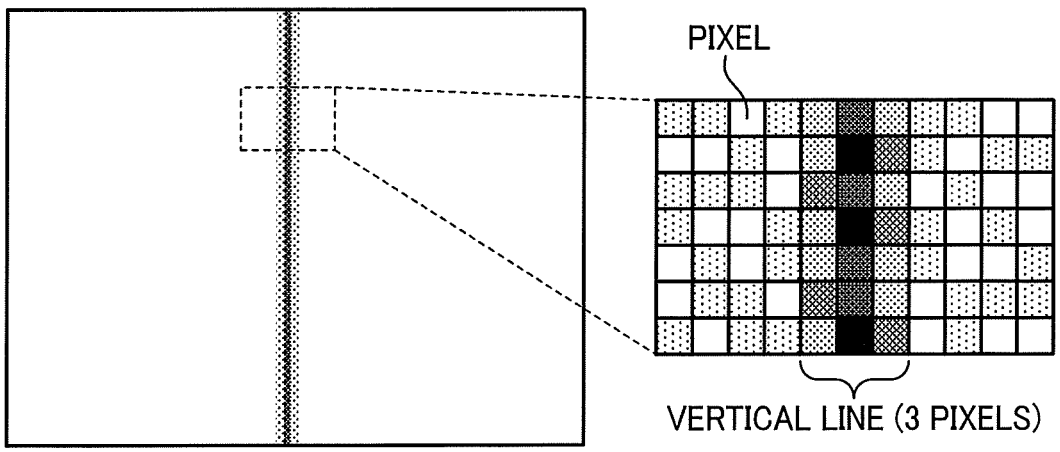

FIG. 4A illustrates an example of the image affected by the defective pixel with the RTS noise when there is a contrast between a peripheral pixel or a plurality of peripheral pixels adjacent to the left side of the defective pixel and a peripheral pixel or a plurality of peripheral pixels adjacent to the right side of the defective pixel. In the example illustrated in FIG. 4A, the defective pixel forms a central one of three vertical lines that together form a vertical line having a thickness of three pixels. Further, in the example of FIG. 4A, vertical lines formed by pixels on the right and left of the defective pixel are uneven in density, and there is a contrast between the vertical lines. As a comparative example, FIG. 4B illustrates the image of the vertical line having the thickness of three pixels as rendered with normal pixels.

If the pixels adjacent to the defect pixel render dense vertical lines, the influence of the defective pixel on the image is inconspicuous, as illustrated in FIG. 4A, and the vertical line rendered by the defect pixel is recognizable as a fine line. Even if there is a defective pixel, therefore, the influence of the defective pixel may be inconspicuous depending on the pattern of the peripheral pixels of the detective pixel. The image of the above-described example has a contrast between three vertical lines rendered by the defective pixel and the pixels on the right and left thereof. If the three vertical lines rendered by the defective pixel and the pixels on the right and left thereof are substantially even in density, however, the image may be affected by the defective pixel.

Figure 4C:
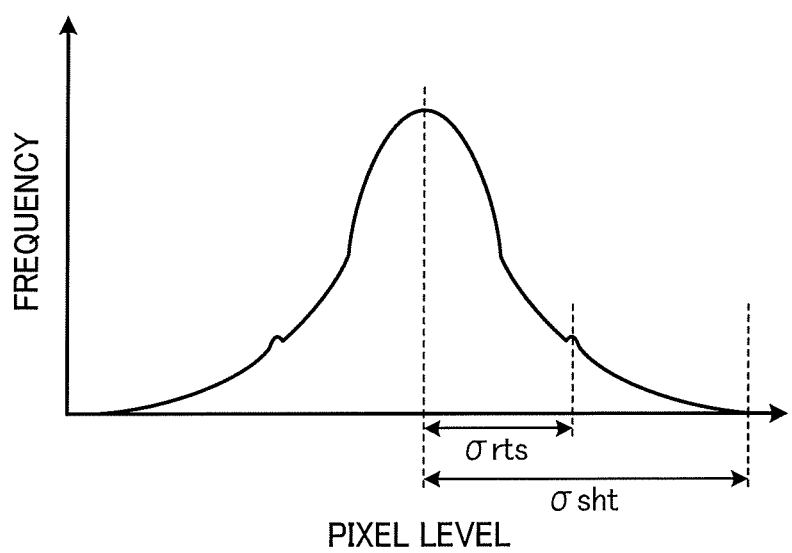
FIG. 4C is a graph illustrating the relationship between the frequency and the pixel level.

If the color of the image to be rendered is white or whitish, the influence of the defective pixel is inconspicuous. This is because the RTS noise is caused by an electrical defect in the defective pixel, and thus the influence of the defective pixel is reduced by the shot noise if the output level of the image data output from the peripheral pixels of the detective pixel equals or exceeds a predetermined level, as illustrated in FIG. 4C.

A description will now be given of issues of an interpolation process applied to a linear sensor, specifically, issues of an interpolation method applied to a linear sensor that performs a one-dimensional photoelectric conversion process on one row or multiple rows of pixels to perform an interpolation process if the noise amount of a target pixel exceeds the mean shot noise amount of the peripheral pixels of the target pixel.

According to this interpolation method, whether or not to perform the interpolation is determined based on the relationship between the RTS noise amount σrts of the defective pixel and the mean shot noise amount σsht calculated from a mean level Dave of the peripheral pixels and the difference in level between the defective pixel and the peripheral pixels. Specifically, it is determined to perform the interpolation if the RTS noise amount σrts exceeds the mean shot noise amount σsht (i.e., σrts>σsht), and if there is a large difference in level between the defective pixel and the peripheral pixels. Therefore, the defective pixel described above with reference to FIG. 3A, which has a relationship σrts<σsht, is not subjected to this interpolation process. That is, if the above-described interpolation method is applied to the linear sensor, the interpolation process is not performed on the defective pixel described above with reference to FIG. 3A, and the vertical line to be corrected is left uncorrected, as illustrated in FIG. 5A.

Figure 5A:
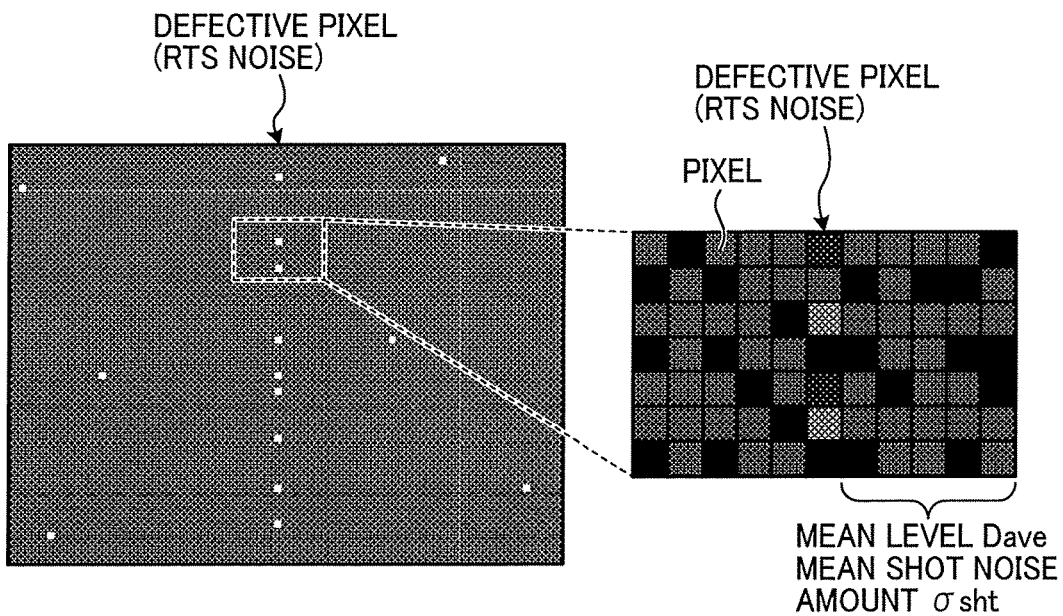
FIGS. 5A and 5B are diagrams illustrating issues of an interpolation method applied to a linear sensor to perform an interpolation process if the noise amount of a target pixel exceeds the mean shot noise amount of peripheral pixels of the target pixel.
Figure 5B:
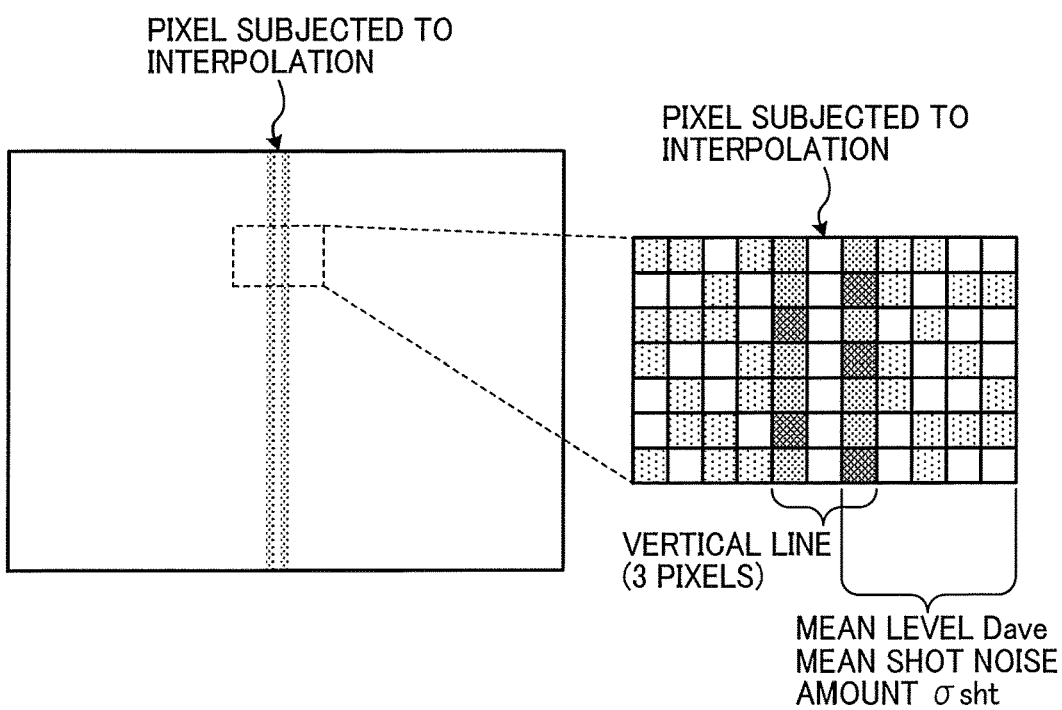

Further, even if the interpolation process is performed on the vertical line illustrated in FIG. 5A based on the relationship σrts>σsht, the interpolation is performed on the pixel corresponding to the central one of the three vertical lines illustrated in FIG. 4A if the contrast described above with reference to FIG. 4A is found between the vertical lines. The level of the pixel to be subjected to the interpolation is replaced by the mean or median of the levels of peripheral pixels peripheral to the pixel to be subjected to the interpolation. Consequently, the level of the pixel corresponding to the central vertical line is replaced by the mean or median of the levels of the peripheral pixels, generating an unintended image with a white line appearing at the center of the three lines, as illustrated in FIG. 5B. In other words, the interpolation process on the defective pixel unintentionally highlights a portion of the image corresponding to the defective pixel.

By contrast, the photoelectric conversion unit 21 of the MFP 100 of the first embodiment selectively corrects a portion of the image affected by the defective pixel, to thereby reduce the influence of the defective pixel on the image. The photoelectric conversion unit 21 further performs the selective correction on a portion of the image affected by a defective pixel with a white flaw, as well as the portion of the image affected by the defective pixel with the RTS noise, to thereby reduce the influence of the defective pixel on the image.

The white flaw is caused by a defect of a photodiode involving the generation of an abnormal dark current flowing through a CMOS image sensor, for example, causing in the image an offset greater than offsets of other pixels. If a pixel has the white flaw, the offset is increased in all lines of the image. If the white flaw occurs in a pixel in the linear sensor, therefore, noise in the form of a vertical line appears in the image. The white flaw occurs in individual photodiodes, and thus occurs in individual pixels.

A hardware configuration of the photoelectric conversion unit 21 will now be described.

Figure 6:
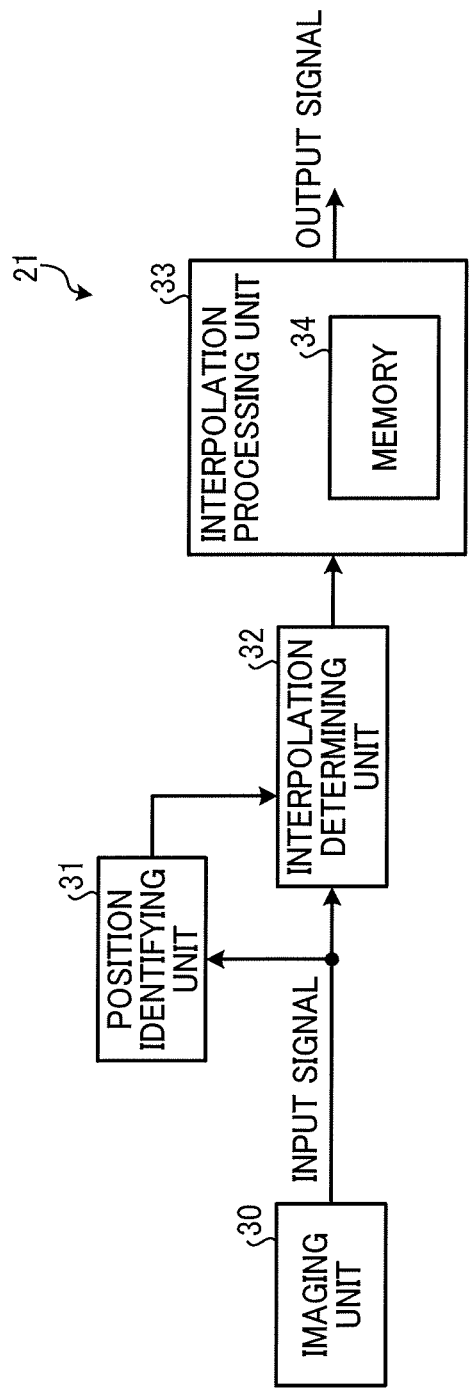
FIG. 6 is a block diagram of a photoelectric conversion unit included in the reading device of the MFP according to the first embodiment.

FIG. 6 is a block diagram of the photoelectric conversion unit 21. As illustrated in FIG. 6, the photoelectric conversion unit 21 includes an imaging unit 30, a position identifying unit 31, an interpolation determining unit 32, and an interpolation processing unit 33. All or some of the imaging unit 30, the position identifying unit 31, the interpolation determining unit 32, and the interpolation processing unit 33 are integrated together. For example, all of the imaging unit 30, the position identifying unit 31, the interpolation determining unit 32, and the interpolation processing unit 33 may be integrated in one integrated circuit (IC) chip. Alternatively, the position identifying unit 31, the interpolation determining unit 32, and the interpolation processing unit 33 may be integrated together separately from the imaging unit 30 and then be sealed in one package together with the imaging unit 30 to form a so-called multichip, which is apparently one large-scale integrated (LSI) circuit. The above-described configurations are illustrative, and the components of the photoelectric conversion unit 21 may be integrated or combined into a multichip in a desired combination. For example, the imaging unit 30 and the position identifying unit 31 may be integrated together and connected to the subsequent interpolation determining unit 32.

In the foregoing description, the position identifying unit 31, the interpolation determining unit 32, and the interpolation processing unit 33 are assumed to be hardware, but may entirely or partially be implemented by software. In this case, the position identifying unit 31, the interpolation determining unit 32, and the interpolation processing unit 33 are provided as a computer program readable and executable by a computer, such as an interpolation processing program, for example. The interpolation processing program may be provided as recorded on a computer-readable recording medium, such as a compact disc-read only memory (CD-ROM) or a flexible disc (FD), in an installable or executable format file. Further, the interpolation processing program may be provided as recorded on a computer-readable recording medium, such as a CD-recordable (CD-R), a digital versatile disk (DVD), a blue-ray disc (registered trademark), or a semiconductor memory. Further, the interpolation processing program may be provided as installed in the MFP 100 via a network such as the Internet. Further, the interpolation processing program may be provided as preinstalled in a ROM of the MFP 100, for example.

The photoelectric conversion unit 21 is, for example, a linear sensor including photoelectric conversion elements for one row or multiple rows of pixels. The imaging unit 30 is, for example, a semiconductor imaging device such as a CMOS image sensor or a CCD image sensor.

The interpolation process will now be described.

In the photoelectric conversion unit 21 having the above-described configuration, the imaging unit 30 is provided for each of red (R), green (G), and blue (B) color channels to generate image data of the respective colors. For example, the position identifying unit 31 acquires a dark-time image for a predetermined time, and detects a defective pixel with a large level fluctuation or a large standard deviation. The position identifying unit 31 then stores color information representing the color channel of the detected defective pixel and address information representing the physical position of the defective pixel in the imaging unit 30. For example, the position identifying unit 31 is provided with a storage area capable of storing such information.

Based on the image data of the peripheral pixels of the defective pixel, the interpolation deter mining unit 32 detects, in the image data supplied by the imaging unit 30, the distribution and level of the image data of the pixel of the color corresponding to the color information and the address information of the defective pixel stored in the position identifying unit 31. The interpolation determining unit 32 then determines, as the interpolation target, a defective pixel meeting predetermined conditions related to the distribution and level of the image data. The interpolation processing unit 33 performs the interpolation process on the defective pixel determined as the interpolation target by the interpolation determining unit 32. The photoelectric conversion unit 21 executes the above-described interpolation process on each of the lines of the image.

The time of executing the interpolation determination process and the time of executing the interpolation process will now be described.

Figure 7:
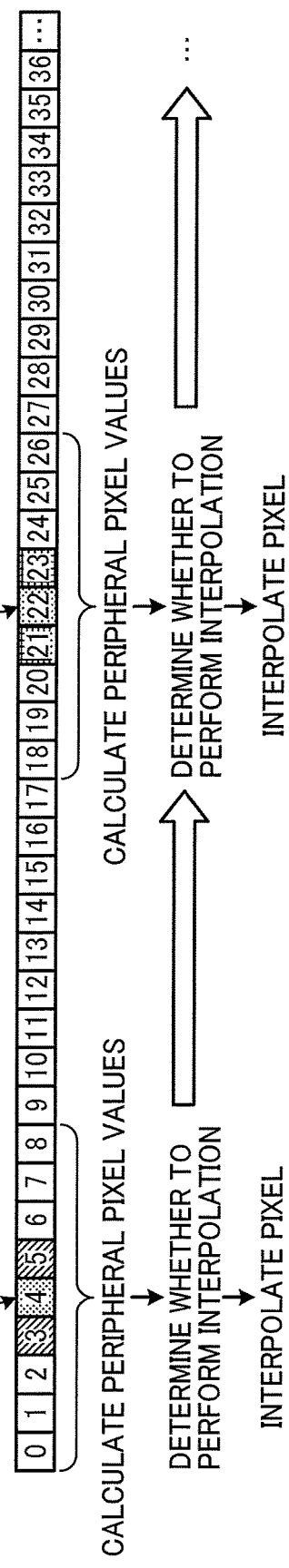
FIG. 7 is a diagram illustrating the time of performing an interpolation determination process in an interpolation determining unit of the photoelectric conversion unit and the time of performing an interpolation process in an interpolation processing unit of the photoelectric conversion unit.

FIG. 7 is a diagram illustrating the time of executing the interpolation determination process in the interpolation determining unit 32 and the time of executing the interpolation process in the interpolation processing unit 33. As illustrated in FIG. 7, the interpolation determination process and the interpolation process are sequentially executed upon supply of the image data of the defective pixel to the interpolation determining unit 32 and the interpolation processing unit 33. In other words, the interpolation determination process and the interpolation process are chronologically performed on the defective pixel.

In the example of FIG. 7, the fourth pixel and the twenty-second pixel are defective pixels. When the image data of the fourth pixel or the twenty-second pixel is supplied to the interpolation determining unit 32, the interpolation determining unit 32 performs the interpolation determination process. Based on the result of the interpolation determination process, the interpolation processing unit 33 performs the interpolation process on the image data of the defective pixel in accordance with the level of the image data of the peripheral pixels of the defective pixel, for example.

Since the interpolation determination process and the interpolation process are thus executed chronologically, there is no need for a memory that stores the entire image data of one line. As illustrated in FIG. 6, therefore, the interpolation processing unit 33 includes a small-capacity memory i having a capacity of storing the data of a few pixels to store the image data of the peripheral pixels necessary for an arithmetic operation of the interpolation determination process and for the interpolation process. This configuration contributes to a reduction in manufacturing costs of the MFP 100.

The arithmetic operation performed in the interpolation determination process will now be described.

Figure 8:
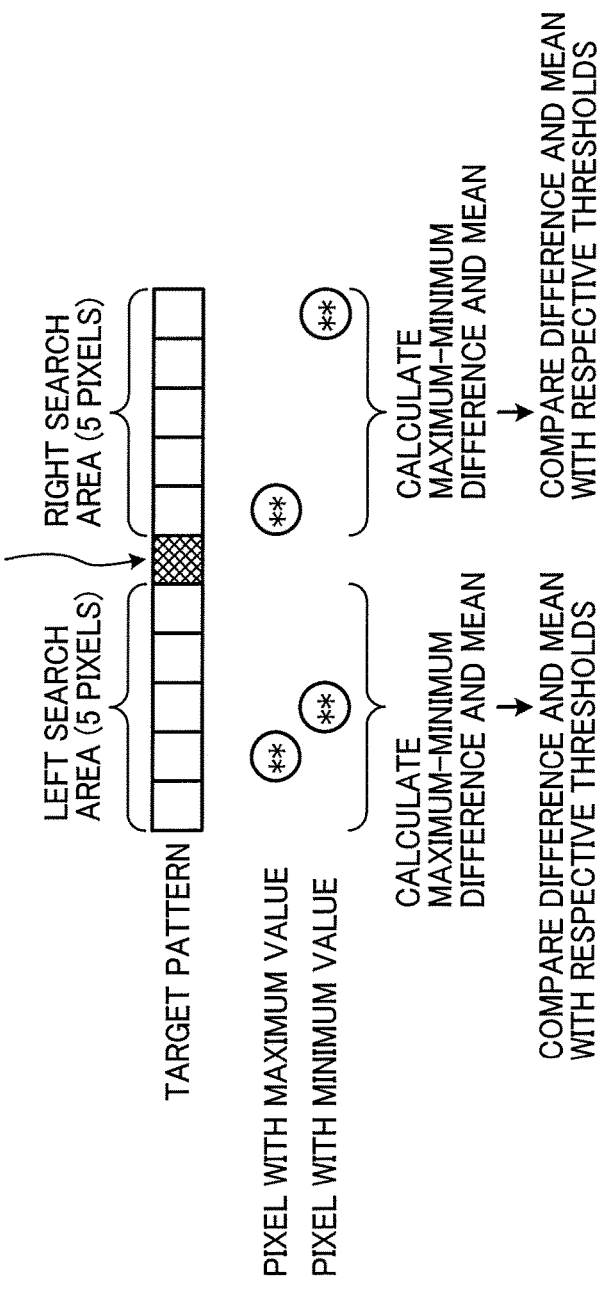
FIG. 8 is a diagram illustrating an arithmetic operation performed in the interpolation determination process by the interpolation determining unit.

FIG. 8 is a diagram illustrating the arithmetic operation performed in the interpolation deter urination process by the interpolation determining unit 32. The interpolation determining unit 32 determines, for each of the lines of the image, whether or not the peripheral pixels of each defective pixel correspond to a high-density solid area. FIG. 8 illustrates an example in which the interpolation determining unit 32 determines whether or not five peripheral pixels on the right of the defective pixel correspond to a high-density solid area and whether or not five peripheral pixels on the left of the defective pixel correspond to a high-density solid area. In this example, the arithmetic operation is performed on the five peripheral pixels on the right of the defective pixel and the five peripheral pixels on the left of the defective pixel. The arithmetic operation, however, may be performed on two, three, or eight peripheral pixels, for example, on each of the right and left of the defective pixel.

The interpolation determining unit 32 calculates, for each of the RGB colors, a difference $\Delta L$ between the maximum value and the minimum value of the image data formed by the five left pixels adjacent to the left side of the defective pixel. That is, the interpolation determining unit 32 calculates differences $\Delta RL$, $\Delta GL$, and $\Delta BL$ for the respective RGB colors. The interpolation determining unit 32 further calculates, for each of the RGB colors, a difference $\Delta R$ between the maximum value and the minimum value of the image data formed by the five right pixels adjacent to the right side of the defective pixel. That is, the interpolation determining unit 32 calculates differences $\Delta RR$, $\Delta GR$, and $\Delta BR$ for the respective RGB colors.

Through the calculation the differences $\Delta L$ and $\Delta R$, the interpolation determining unit 32 calculates the degree of change in the level of the peripheral pixels of the defective pixel. An increase in the calculated difference $\Delta L$ or $\Delta R$ indicates an increase of the change in the level of the image data. If the calculated difference $\Delta L$ or $\Delta R$ is large, the interpolation determining unit 32 deter mines that the change in the level of the image data is large, and thus that the peripheral pixels of the defective pixel have a contrast therebetween, which forms a pattern image of uneven density.

The interpolation determining unit 32 further calculates, for each of the RGB colors, a mean Lave of the image data formed by the five left pixels adjacent to the left side of the defective pixel. That is, the interpolation determining unit 32 calculates means RLave, GLave, and BLave for the respective RGB colors. The interpolation determining unit 32 further calculates, for each of the RGB colors, a mean Rave of the image data formed by the five right pixels adjacent to the right side of the defective pixel. That is, the interpolation determining unit 32 calculates means RRave, GRave, and BRave for the respective RGB colors. Each of the means Lave and Rave represents the density of the corresponding peripheral pixels. If the mean Lave or Rave is increased, the interpolation determining unit 32 determines that the density of the corresponding peripheral pixels is reduced, i.e., the color of the peripheral pixels is closer to white.

The interpolation determination process will now be described.

With the differences $\Delta L$ and $\Delta R$ and the means Lave and Rave of the peripheral pixels, the interpolation determining unit 32 accurately grasps the degree of influence of the peripheral pixels on the defective pixel in determining whether or not to perform the interpolation process.

Figure 9:
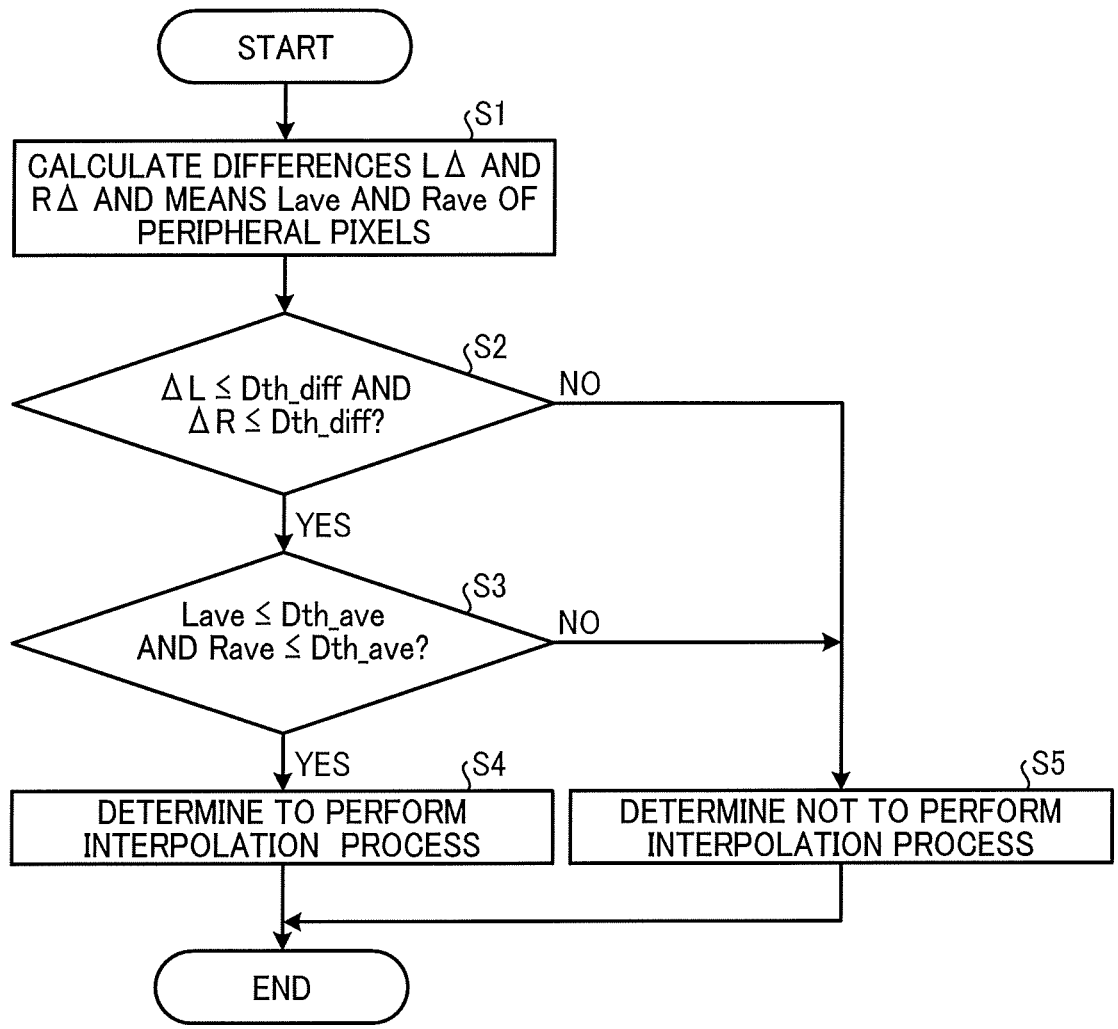
FIG. 9 is a flowchart illustrating a procedure of the interpolation determination process.

FIG. 9 is a flowchart illustrating a procedure of the interpolation determination process. As illustrated in the flowchart, the interpolation determining unit 32 calculates, for each of the RGB colors, the difference ΔL between the maximum value and the minimum value of the left peripheral pixels of the defective pixel, the difference ΔR between the maximum value and the minimum value of the right peripheral pixels of the defective pixel, the mean Lave of the image data of the left peripheral pixels, and the mean Rave of the image data of the right peripheral pixels, as described above (step S1). Then, the interpolation determining unit 32 determines whether or not each of the differences ΔL and ΔR is equal to or less than a predetermined first threshold Dth_diff (step S2).

If at least one of the differences ΔL and ΔR is greater than the first threshold Dth_diff (NO at step S2), the interpolation determining unit 32 determines that the corresponding image area peripheral to the defective pixel has a contrast, i.e., the image area is a pattern area, for example. As described above with reference to FIG. 4A, the influence of the defective pixel due to pixel anomaly is inconspicuous in an image area having a contrast. Further, if the difference ΔL or ΔR is greater than the first threshold Dth_diff, an image formed by the corresponding peripheral pixels has a low density (i.e., a white or whitish color), and thus the influence of the defective pixel is inconspicuous. If at least one of the differences ΔL and ΔR is greater than the first threshold Dth_diff, therefore, the interpolation determining unit 32 determines not to perform the interpolation process, and transmits the result of this determination to the interpolation processing unit 33 (step S5).

If each of the differences ΔL and ΔR is equal to or less than the first threshold Dth_diff (YES at step S2), the interpolation determining unit 32 determines whether or not each of the means Lave and Rave is equal to or less than a predetermined second threshold Dth_ave (step S3). As described above with reference to FIG. 4C, if the level of the image data of the peripheral pixels is greater than a specific level (i.e., the second threshold Dth_ave), the influence of the noise caused by the electric factor in the defective pixel is masked by the shot noise, and thus becomes inconspicuous in the image. If the level of the image data of the peripheral pixels is equal to or less than the specific level, the noise appears in the image without being masked by the shot noise.

If each of the means Lave and Rave is equal to or less than the second threshold Dth_ave (YES at step S3), therefore, the noise is not masked by the shot noise. Thus, the interpolation determining unit 32 determines to perform the interpolation process, and transmits the result of this determination to the interpolation processing unit 33 (step S4). If at least one of the means Lave and Rave is greater than the second threshold Dth_ave (NO at step S3), the noise is masked by the shot noise. Thus, the interpolation determining unit 32 determines not to perform the interpolation process, and transmits the result of this determination to the interpolation processing unit 33 (step S5).

The interpolation process of the interpolation processing unit 33 will now be described.

Figure 10:
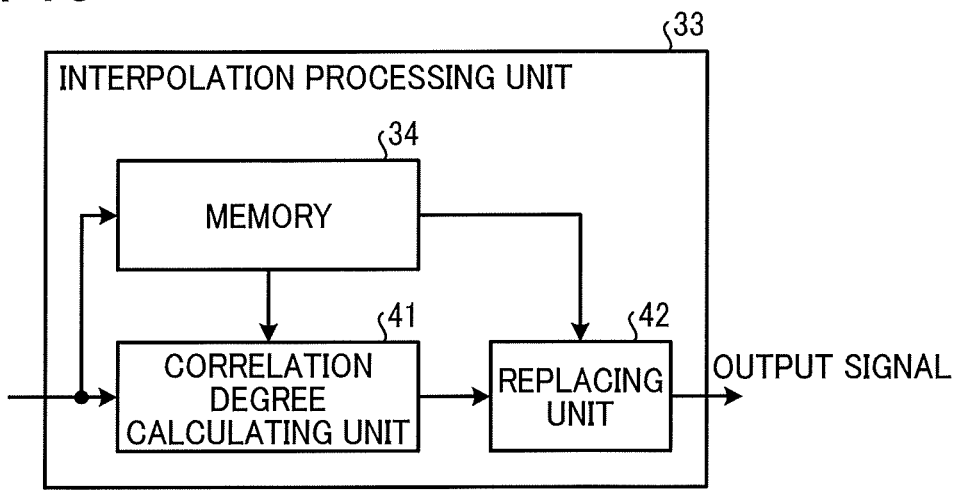
FIG. 10 is a block diagram of the interpolation processing unit.

FIG. 10 is a more detailed block diagram of the interpolation processing unit 33 illustrated in FIG. 6. As illustrated in FIG. 10, the interpolation processing unit 33 includes a correlation degree calculating unit 41 and a replacing unit 42, as well as the above-described memory 34 having the capacity of storing the data of a few pixels.

As illustrated in FIGS. 11A and 11B, for example, the interpolation processing unit 33 searches a search area (i.e., a target pattern) for a candidate pixel to be used in the interpolation of the defective pixel determined as the interpolation target by the interpolation determining unit 32. In this example, the search area includes one line of 16 pixels preceding the defective pixel, two lines of 16 pixels above and below the one line of 16 pixels preceding the defective pixel, one line of 16 pixels following the defective pixel, and two lines of 16 pixels above and below the one line of 16 pixels following the defective pixel. The interpolation processing unit 33 further sets a template, which is an area including the defective pixel, two pixels preceding the defective pixel, two pixels above the two preceding pixels, two pixels below the two preceding pixels, two pixels following the defective pixel, two pixels above the two following pixels, and two pixels below the two following pixels. The interpolation processing unit 33 then compares the template with the above-described target pattern (i.e., the image data of the three lines of 16 pixels on one side of the defective pixel and the three lines of 16 pixels on the other side of the defective pixel) while moving the template by one pixel after each comparison, and calculates the degree of correlation between the template and each of portions of the target pattern.

For example, the sum of absolute difference (SAD) value is used to represent the degree of correlation. In the example of FIGS. 11A and 11B, the interpolation processing unit 33 calculates 24 SAD values SAD1 to SAD24, for example, based on equations including equations (1) and (2) given below.

$$SAD1=(P11-T11)+(P12-T12)+(P13-T13)+(P21-T21)+(P22-T22)+(P23-T23)+(P31-T31)+(P32-T32)+(P33-T33) \quad (1)$$

$$SAD24=(P281-T11)+(P282-T12)+(P283-T13)+(P291-T21)+(P292-T22)+(P293-T23)+(P301-T31)+(P302-T32)+(P303-T33) \quad (2)$$

The SAD values SAD2 to SAD23 are calculated similarly as above. The interpolation processing unit 33 then performs a replacement process of replacing the defective pixel with a replacing pixel, which is the central pixel of a portion of the target pattern corresponding to the minimum of the calculated SAD values SAD1 to SAD24 (i.e., the maximum correlation degree).

In the above-described equations and FIGS. 11A and 11B, "SAD" indicates a SAD value. "SAD1" indicates the first SAD value, and "SAD24" indicates the twenty-fourth SAD value. Further, "P" indicates a pixel of the target pattern. "P11" indicates the first pixel of the first line of the target pattern, and "P321" indicates the thirty-second pixel of the first line of the target pattern. Similarly, "P13" indicates the first pixel of the third line of the target pattern, and "P323" indicates the thirty-second pixel of the third line of the target pattern. Further, "T" indicates a pixel of the template. "T11" indicates the first pixel of the first line of the template, and "T41" indicates the fourth pixel of the first line of the template. Similarly, "T13" indicates the first pixel of the third line of the template, and "T43" indicates the fourth pixel of the third line of the template.

The interpolation processing unit 33 performs the arithmetic process based on the above-described equations to calculate the SAD values SAD1 to SAD24. Then, if the SAD value SAD22 is the minimum of the SAD values SAD1 to SAD24, for example, the interpolation processing unit 33 performs the replacement process of replacing the defective pixel with the replacing pixel, which is, in this case, pixel P282 corresponding to the central pixel of the portion of the target pattern having the minimum of the calculated SAD values.

Figure 12:
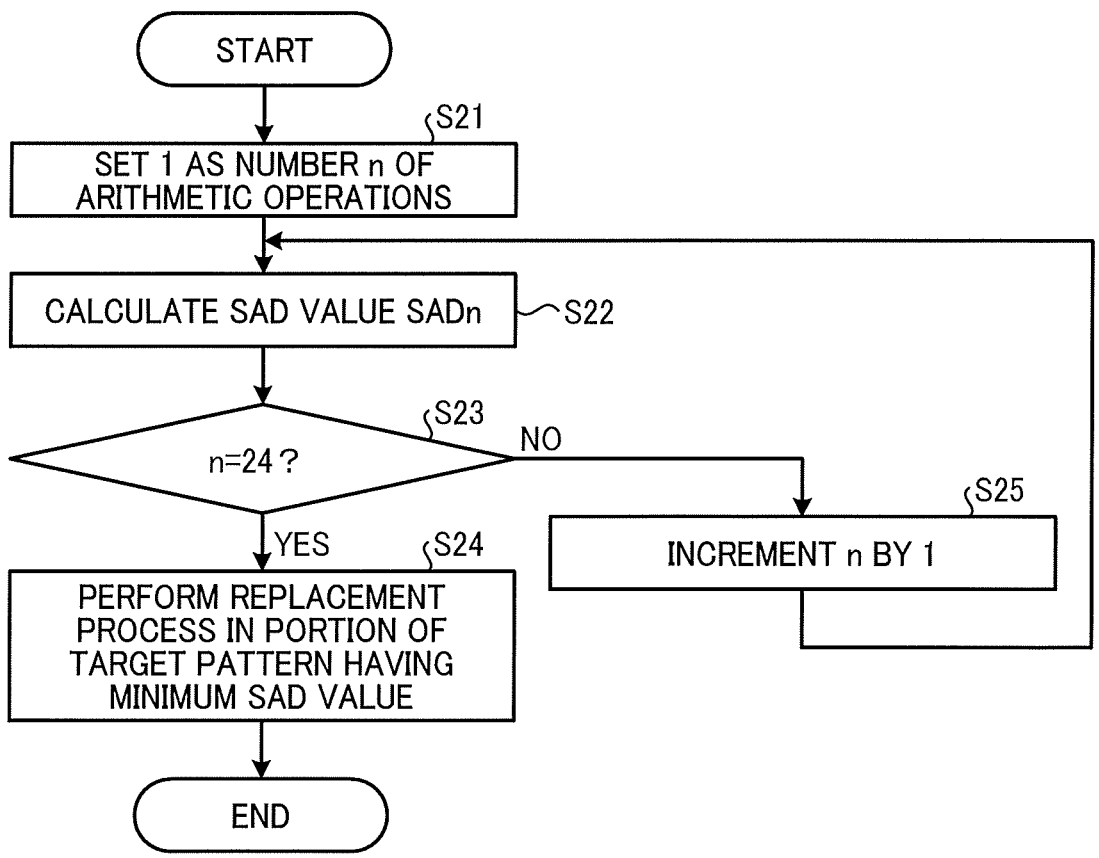
FIG. 12 is a flowchart illustrating a procedure of the interpolation process.

FIG. 12 is a flowchart illustrating a procedure of the above-described interpolation process. At step S21, the correlation degree calculating unit 41 illustrated in FIG. 10 sets a value 1 in a counter as the number n of arithmetic operations for calculating the SAD values (i.e., n=1) In the example of FIGS. 11A and 11B, the correlation degree calculating unit 41 calculates 24 SAD values in total. At step S21, therefore, the correlation degree calculating unit 41 first sets in the counter the value 1 as the number n of arithmetic operations for calculating the first SAD value SAD1. Each time the calculation of the SAD value is completed, the correlation degree calculating unit 41 increments the value of the counter by one, from 1 to 2 or 2 to 3, for example, up to 24. The increment takes place when the template is moved in the target pattern by one pixel.

Then, at step S22, the correlation degree calculating unit 41 calculates a SAD value SADn based on the above-described equations. Herein, n in SADn corresponds to the number of the SAD value to be calculated, i.e., one of 1 to 24. At step S23, the correlation degree calculating unit 41 determines whether or not the number n of arithmetic operations has reached 24 (i.e., n=24). As described above, the correlation degree calculating unit 41 performs the arithmetic operation by moving the template in the target pattern by one pixel after each comparison. If the number n of arithmetic operations has not reached 24 (NO at step S23), therefore, the procedure proceeds to step S25 to increment the number n of arithmetic operations by one (i.e., n=n+1). Then, the procedure returns to step S22 to calculate the next SAD value SADn.

After 24 SAD values are thus calculated (YES at step S23), the procedure proceeds to step S24. At step S24, the replacing unit 42 illustrated in FIG. 10 performs the interpolation process, i.e., the replacement process of replacing the defective pixel with the replacing pixel, which is the central pixel of the portion of the target pattern corresponding to the minimum of the 24 calculated SAD values. Thereby, the process of the flowchart in FIG. 12 is completed.

The MFP 100 of the first embodiment having the above-described configuration includes the interpolation determining unit 32 that determines whether or not to perform the interpolation process on the pixel detected as the defective pixel. The interpolation deter mining unit 32 makes this determination based on the contrast in the image formed by the plurality of peripheral pixels adjacent to the lateral sides of the pixel detected as the defective pixel and the level of the image data of the peripheral pixels. Further, the interpolation processing unit 33 performs the interpolation process on the pixel determined as the target of the interpolation process by the interpolation determining unit 32. Thereby, the interpolation process on the defective pixel is accurately performed.

A configuration of the MFP 100 according to a second embodiment of the present invention will now be described.

The influence of the defective pixel on the image increases with an increase in the density of the image on one of the lateral sides of the defective pixel in a color channel corresponding to the defective pixel. For instance, if the image includes a black portion, and if an edge of the black portion is read in a defective pixel, an image area corresponding to one of the lateral sides of the defective pixel has a low density, and an image area corresponding to the other lateral side of the defective pixel has a high density, consequently making the influence of the defective pixel on the image conspicuous.

According to the second embodiment, therefore, the interpolation process is executed if the foregoing conditions for performing the interpolation are met by the difference ΔL and the mean Lave of the image data of the left peripheral pixels of the defective pixel or the difference ΔR and the mean Rave of the image data of the right peripheral pixels of the defective pixel. The second embodiment is similar to the first embodiment except for this feature. Therefore, the difference of the second embodiment from the first embodiment will be described below, and redundant description will be omitted.

Figure 13:
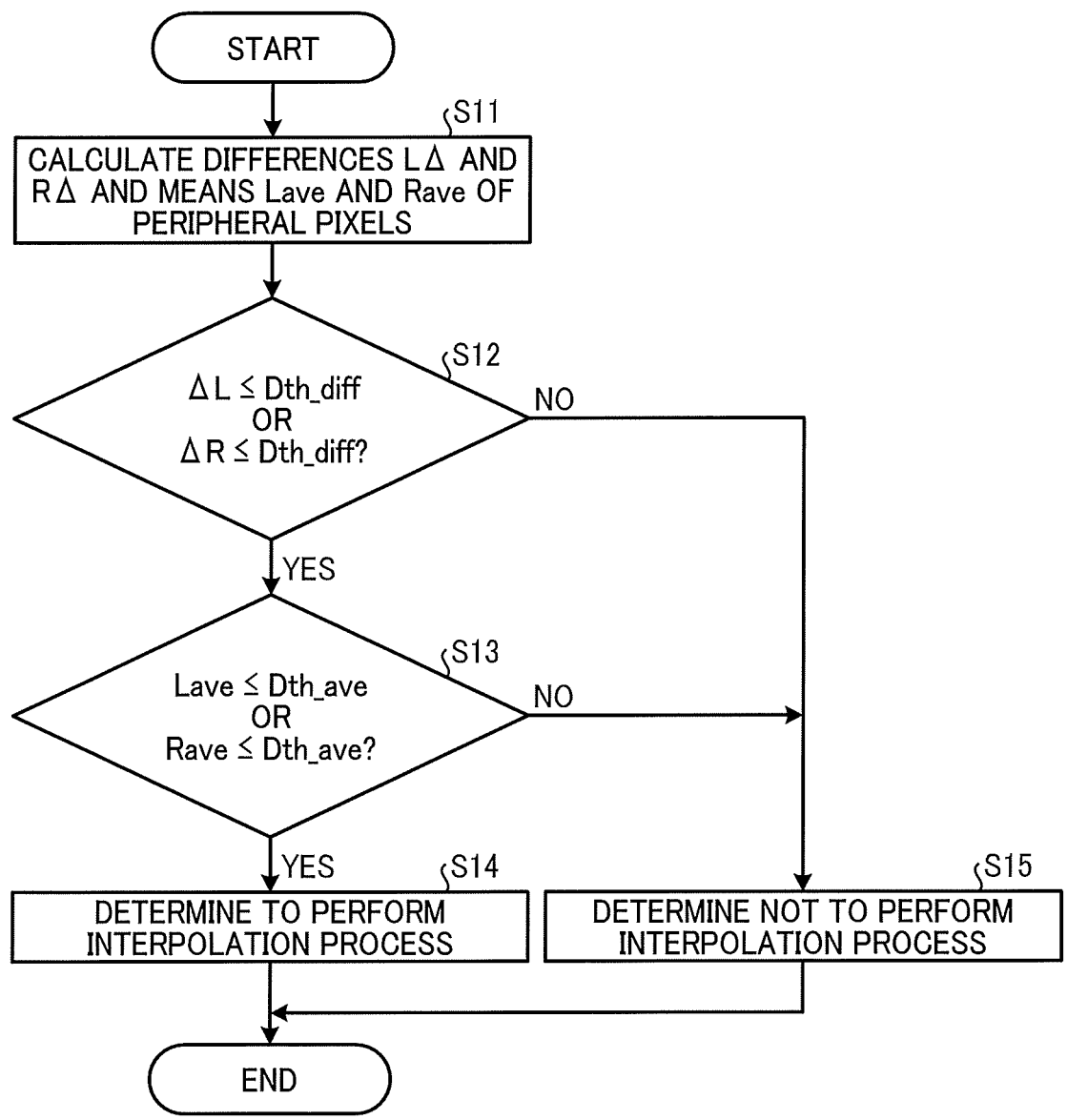
FIG. 13 is a flowchart illustrating a procedure of an interpolation determination process by the interpolation determining unit of the MFP according to a second embodiment of the present invention.

FIG. 13 is a flowchart illustrating a procedure of the interpolation determination process by the interpolation determining unit 32 of the MFP 100 according to the second embodiment. At step S11 in FIG. 13, the interpolation determining unit 32 calculates the difference ΔL between the maximum value and the minimum value of the image data of the five left pixels adjacent to the left side of the defective pixel and the mean Lave of the image data of the five left pixels. The interpolation determining unit 32 further calculates the difference ΔR between the maximum value and the minimum value of the image data of the five right pixels adjacent to the right side of the defective pixel and the mean Rave of the image data of the five right pixels.

At step S12, the interpolation determining unit 32 determines whether or not the difference ΔL of the five left pixels adjacent to the left side of the defective pixel or the difference ΔR of the five right pixels adjacent to the right side of the defective pixel is equal to or less than the first threshold Dth_diff. If having determined that the difference ΔL or ΔR is greater than the first threshold Dth_diff (NO at step S12), the interpolation determining unit 32 proceeds to step S15 to determine not to perform the interpolation process on the defective pixel, and completes the process of the flowchart in FIG. 13.

If having determined that the difference ΔL or ΔR is equal to or less than the first threshold Dth_diff (YES at step S12), the interpolation determining unit 32 proceeds to step S13 to determine whether or not the mean Lave of the five left pixels adjacent to the left side of the defective pixel or the mean Rave of the five right pixels adjacent to the right side of the defective pixel is equal to or less than the second threshold Dth_ave. If having determined that the mean Lave or Rave is greater than the second threshold Dth_ave (NO at step S13), the interpolation determining unit 32 proceeds to step S15 to determine not to perform the interpolation process on the defective pixel, and completes the process of the flowchart in FIG. 13.

If the interpolation determining unit 32 determines that the mean Lave or Rave is equal to or less than the second threshold Dth_ave (YES at step S13), the interpolation determining unit 32 proceeds to step S14 to determine to perform the interpolation process on the defective pixel, and completes the process of the flowchart in FIG. 13.

According to the second embodiment, the interpolation process is thus performed if the conditions for performing the interpolation are met by the left peripheral pixels adjacent to the left side of the defective pixel or the right peripheral pixels adjacent to the right side of the defective pixel.

A configuration of the MFP 100 according to a third embodiment of the present invention will now be described.

When a yellow color patch is read, for example, high-level image data (i.e., a low-density image) is generated in the R channel and the G channel, while low-level image data (i.e., a high-density image) is generated in the B channel. In this case, if there is a defective pixel in the B channel for generating the low-level image data, the read image of the yellow color patch is formed with image data affected by the defective pixel. Consequently, the defective pixel may affect the low-density image ultimately generated from RGB images. In other words, although the influence of the defective pixel is normally inconspicuous in a yellow image having a low density, the presence of a defective pixel in the channel of a high-density color may affect the low-density image ultimately generated from the RGB images.

According to the third embodiment, therefore, the interpolation determining unit 32 of the MFP 100 determines to perform the interpolation process if the defective pixel in any of the RGB channels meets the conditions for performing the interpolation described in the first and second embodiments. Accordingly, the interpolation process is performed on the image data in all of the color channels.

The third embodiment is similar to the foregoing embodiments except for the above-described feature. The foregoing description of the first and second embodiments should be referred to for other configurations, operations, and effects of the third embodiment.

A configuration of the MFP 100 according to a fourth embodiment of the present invention will now be described.

FIG. 14 illustrates a configuration of a photoelectric conversion unit 21B included in the MFP 100 according to the fourth embodiment. In the photoelectric conversion unit 21B of the MFP 100 according to the fourth embodiment, the imaging unit 30 is followed by a variable amplifier circuit 35 to amplify the image data generated by the imaging unit 30 with a variable gain. The gain of the variable amplifier circuit 35 is changed by a control unit 50 of the MFP 100 in accordance imaging conditions, for example. The control unit 50 further changes at least one of the first threshold Dth_diff and the second threshold Dth_ave in accordance with the gain value of the variable amplifier circuit 35. The control unit 50 of the MFP 100 is a processor that controls the processing of the MFP 100, and is implemented by a central processing unit (CPU) and memories, for example.

The interpolation determining unit 32 performs the above-described interpolation determination process in accordance with the current gain value set in the variable amplifier circuit 35. Specifically, if the imaging unit 30 images a high-density image, for example, the imaging unit 30 outputs low-level image data. The low-level image data is therefore amplified with a high gain value and output. If a high gain value is set in the variable amplifier circuit 35, therefore, the interpolation determining unit 32 determines to perform the interpolation process.

If the imaging unit 30 images a low-density image, the imaging unit 30 outputs high-level image data. The high-level image data is therefore amplified with a low gain value and output. If a low gain value is set in the variable amplifier circuit 35, therefore, the interpolation determining unit 32 determines not to perform the interpolation process.

According to the fourth embodiment, therefore, whether or not to perform the interpolation process is determined based on the gain of the variable amplifier circuit 35 that amplifies the image data from the imaging unit 30. Accordingly, the fourth embodiment prevents a decline in productivity due to a gain changing process, for example, and provides similar effects to those of the foregoing embodiments.

A configuration of the MFP 100 according to a fifth embodiment of the present invention will now be described.

For example, if there is a defective pixel in the R channel and the interpolation process is performed only on the image data of the defective pixel in the R channel (i.e., only on a single color), the interpolation process may add an unexpected color hue to the image formed in the three colors, causing noise in the image. When performing the interpolation process on the defective pixel in one of the color channels, therefore, the MFP 100 according to the fifth embodiment also performs the interpolation process on the same pixel in the other color channels. That is, the interpolation process is performed in all of the color channels.

Specifically, as illustrated in FIG. 15, for example, it is assumed that the fourth pixel in the R channel, the twenty-sixth pixel in the G channel, and the nineteenth pixel in the B channel are defective pixels. It is further assumed that the correlation degree calculating unit 41 of the interpolation processing unit 33 has detected the tenth pixel in the R channel, for example, as the pixel to be used in the interpolation process on the fourth pixel in the R channel, which is a defective pixel. In this case, the replacing unit 42 of the interpolation processing unit 33 performs a replacement process of replacing the image data of the fourth pixel (i.e., defective pixel) in the R channel with the image data of the tenth pixel in the R channel. The replacing unit 42 further performs a replacement process of replacing the image data of the fourth pixel in the G channel with the image data of the tenth pixel in the G channel and a replacement process of replacing the image data of the fourth pixel in the B channel with the image data of the tenth pixel in the B channel.

Similarly, it is assumed that the correlation degree calculating unit 41 has detected the fifteenth pixel in the G channel, for example, as the pixel to be used in the interpolation process on the twenty-sixth pixel in the G channel, which is a defective pixel. In this case, the replacing unit 42 performs a replacement process of replacing the image data of the twenty-sixth pixel (i.e., defective pixel) in the G channel with the image data of the fifteenth pixel in the G channel. The replacing unit 42 further performs a replacement process of replacing the image data of the twenty-sixth pixel in the R channel with the image data of the fifteenth pixel in the R channel and a replacement process of replacing the image data of the twenty-sixth pixel in the B channel with the image data of the fifteenth pixel in the B channel.

Similarly, it is assumed that the correlation degree calculating unit 41 has detected the thirty-second pixel in the B channel, for example, as the pixel to be used in the interpolation process on the nineteenth pixel in the B channel, which is a defective pixel. In this case, the replacing unit 42 performs a replacement process of replacing the image data of the nineteenth pixel (i.e., defective pixel) in the B channel with the image data of the thirty-second pixel in the B channel. The replacing unit 42 further performs a replacement process of replacing the image data of the nineteenth pixel in the R channel with the image data of the thirty-second pixel in the R channel and a replacement process of replacing the image data of the nineteenth pixel in the G channel with the image data of the thirty-second pixel in the G channel.

According to the fifth embodiment, the interpolation process is thus performed on the same pixel in all of the color channels. Accordingly, the accuracy of the interpolation is improved, and effects similar to those of the foregoing embodiments are obtained.

The replacement process may be performed with the mean of the image data in all color channels. For example, if the tenth pixel in the R channel is detected as the pixel to be used in the interpolation process on the fourth pixel (i.e., defective pixel) in the R channel in the above-described example, the interpolation process may be performed on the image data of the fourth pixel in each of the RGB channels with the mean of the image data of the tenth pixel in the R channel, the image data of the tenth pixel in the G channel, and the image data of the tenth pixel in the B channel. This configuration provides effects similar to those described above.

A configuration of the MFP 100 according to a sixth embodiment of the present invention will now be described.

If it is found from the above-described calculation of the degree of correlation between the target pattern and the template that the central pixel of the selected portion of the target pattern (i.e., the replacing pixel) is another defective pixel, as illustrated in FIG. 16, the interpolation process may fail to provide a desirable result. In the sixth embodiment, therefore, if the image data of the portion of the target pattern (i.e., the search area) includes another defective pixel, the correlation degree calculating unit 41 of the interpolation processing unit 33 excludes the another defective pixel from the calculation of the correlation degree, i.e., omits the correlation degree calculating operation in the portion of the target pattern including the another defective pixel, to calculate the correlation degree in another portion of the target pattern not including a defective pixel.

Specifically, the position of each defective pixel is previously stored in the position identifying unit 31 illustrated in FIG. 6. The correlation degree calculating unit 41 refers to the position of the defective pixel previously stored in the position identifying unit 31. Then, if the currently selected portion of the target pattern includes a defective pixel, the correlation degree calculating unit 41 does not calculate the correlation degree, and moves the template to the next portion of the target pattern not including a defective pixel to calculate the correlation degree in the next portion of the target pattern.

With this configuration, the sixth embodiment improves the accuracy of the interpolation of the defective pixel, and provides effects similar to those of the foregoing embodiments.

A configuration of the MFP 100 according to a seventh embodiment of the present invention will now be described.

Figure 17:
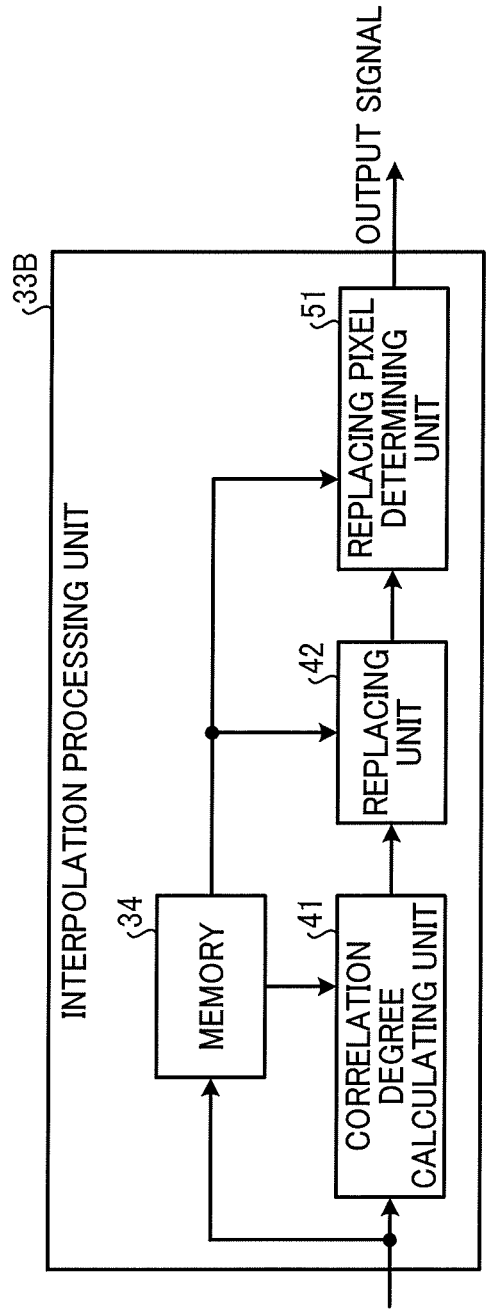
FIG. 17 is a block diagram of an interpolation processing unit included in the MFP according to a seventh embodiment of the present invention.

According to the seventh embodiment, the validity of the interpolation process is checked before the image data is output. FIG. 17 is a block diagram of an interpolation processing unit 33B provided in the photoelectric conversion unit 21 of the MFP 100 according to the seventh embodiment. In the seventh embodiment, the replacing unit 42 of the interpolation processing unit 33B is followed by a replacing pixel determining unit 51, as illustrated in FIG. 17.

Figure 18:
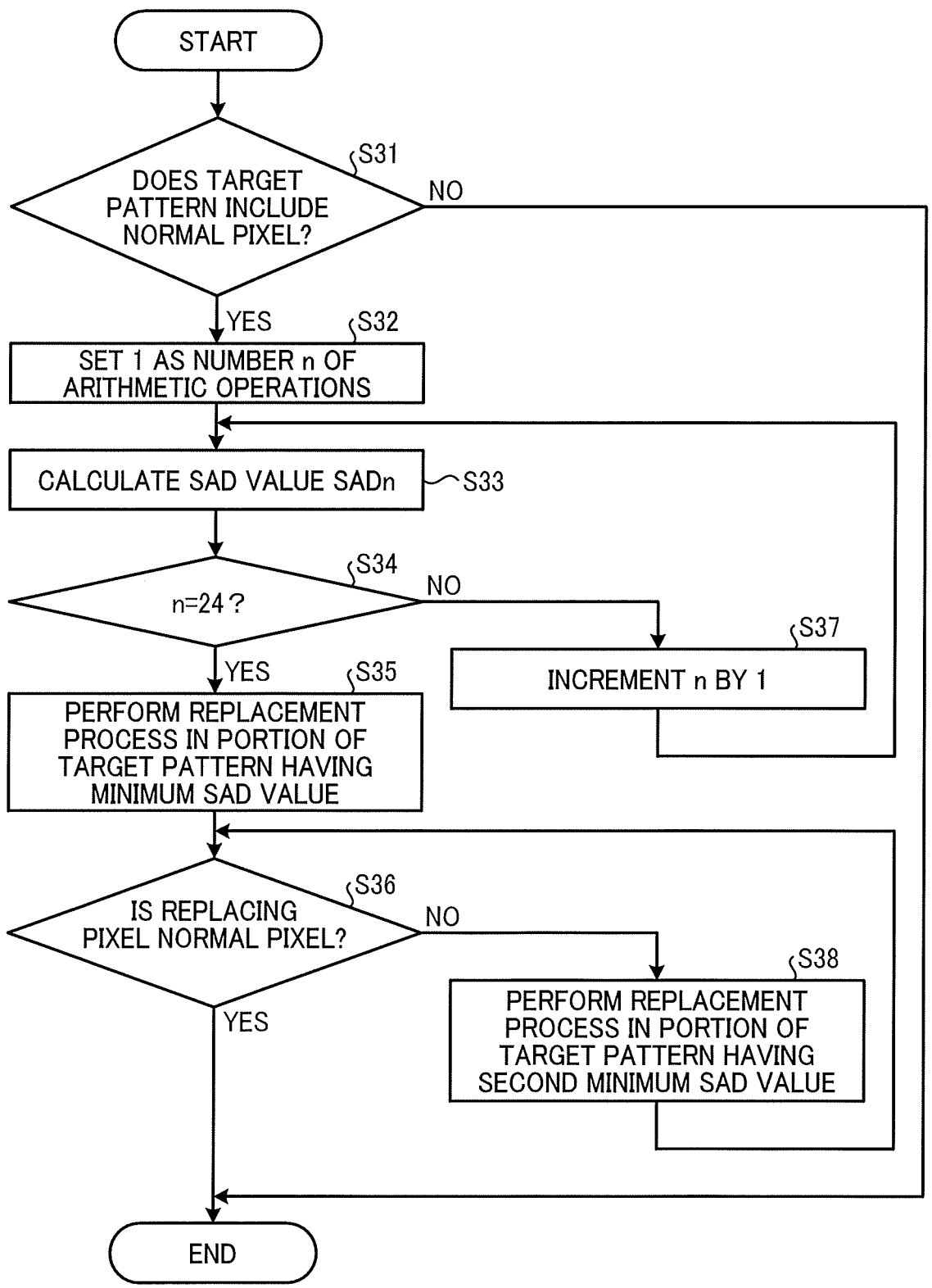
FIG. 18 is a flowchart illustrating a procedure of an operation according to the seventh embodiment of checking the validity of the interpolation process before outputting image data.

FIG. 18 is a flowchart illustrating a procedure of such an operation of checking the validity of the interpolation process before outputting the image data. At step S31, the correlation degree calculating unit 41 determines whether or not the target pattern includes a normal pixel based on the position information of defective pixels stored in the position identifying unit 31. If the pixels in the target pattern are all defective pixels (NO at step S31), the process of the flowchart in FIG. 18 is completed without execution of the interpolation process.

If the target pattern includes a normal pixel (YES at step S31), the correlation degree calculating unit 41 performs the processes of steps S32, S33, S34, S35, and S37. Steps S32, S33, S34, S35, and S37 in FIG. 18 correspond to steps S21, S22, S23, S24, and S25 in FIG. 12, respectively. At steps S32, S33, S34, and S37, the correlation degree calculating unit 41 calculates 24 SAD values, for example, while moving the template in the target pattern, as described above with reference to FIG. 12. Then, at step S35, the replacing unit 42 performs the interpolation process, i.e., the replacement process of replacing the defective pixel with the replacing pixel, which is the central pixel of the portion of the target pattern corresponding to the minimum of the calculated SAD values.

If it is found from the calculation of the correlation degree with the template that the central pixel of the selected portion of the target pattern (i.e., the replacing pixel) is another defective pixel, it is highly unlikely that replacement with such a replacing pixel will generate desirable image data. The replacing pixel determining unit 51 therefore determines whether or not the replacing pixel is a defective pixel based on the position information of the detective pixels stored in the position identifying unit 31 (step S36). If the replacing pixel determining unit 51 determines that the replacing pixel is a defective pixel (NO at step S36), the replacing unit 42 performs a re-interpolation process, i.e., a replacement process of replacing the defective pixel with another replacing pixel, which is the central pixel of the portion of the target pattern corresponding to the second minimum SAD value next to the above-described minimum SAD value (i e, the second highest correlation degree) (step S38).

If the replacing pixel determining unit 51 determines that the central pixel used in the re-interpolation process is not a defective pixel (YES at step S36), the image data of the pixel subjected to the re-interpolation process is output. Thereby, the process of the flowchart in FIG. 18 is completed. If the central pixel used in the re-interpolation process is a defective pixel (NO at step S36), the replacing unit 42 performs another replacement process (step S38) to replace the defective pixel with still another replacing pixel, which is the central pixel of the portion of the target pattern corresponding to the third minimum SAD value. This re-interpolation process is repeated until it is determined that the central pixel used in the re-interpolation process is not a defective pixel.

With this configuration of the seventh embodiment, an interpolation failure due to the defective pixel is prevented, thereby improving the accuracy of the interpolation. Further, effects similar to those of the foregoing embodiments are obtained.

A configuration of the MFP 100 according to an eighth embodiment of the present invention will now be described.

When the correlation degree is calculated with the template moved in the target pattern, as described above, and the defective pixel is replaced by the central pixel of the selected portion of the target pattern (i.e., the replacing pixel), a level difference $\Delta Dcol\_*$ (wherein the asterisk represents one of RGB) of the level of the replacing pixel from the level of the peripheral pixels may be greater than a specific level. In this case, it is highly possible that the interpolation process has failed. In the eighth embodiment, therefore, the level difference $\Delta Dcol\_*$ of the replacing pixel is determined based on a predetermined third threshold $\Delta Dth$ to prevent such a failure. Then, if the level difference $\Delta Dcol\_*$ is equal to or less than the third threshold $\Delta Dth$, the image data of the replacing pixel is output. In the MFP 100 according to the eighth embodiment, the interpolation processing unit 33 has the hardware configuration of the seventh embodiment illustrated in FIG. 17, in which the replacing unit 42 is followed by the replacing pixel determining unit 51.

Figure 19:
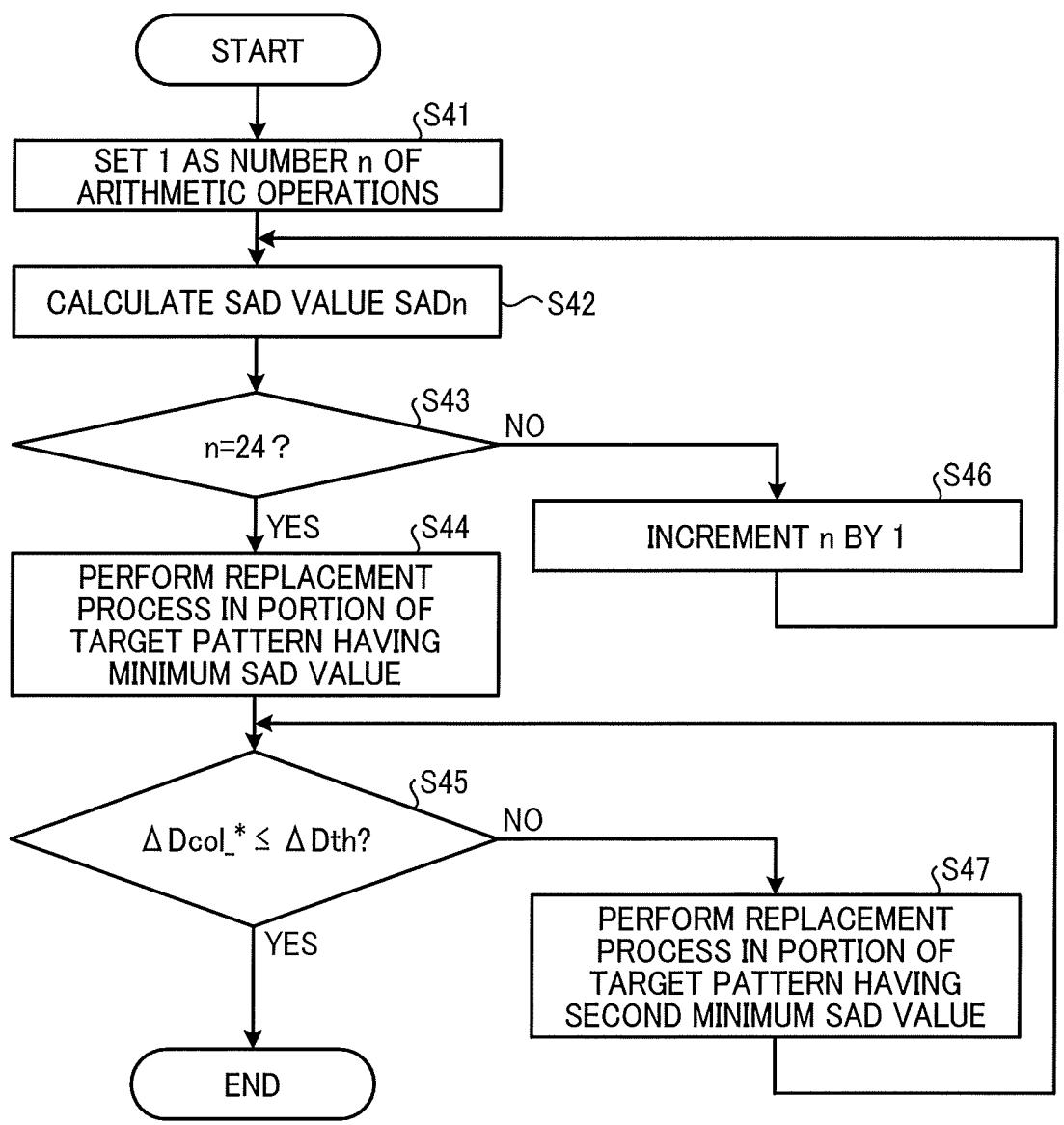
FIG. 19 is a flowchart illustrating a procedure of a level difference determining operation according to an eighth embodiment of the present invention.

FIG. 19 is a flowchart illustrating a procedure of such a level difference determining operation according to the eighth embodiment. Steps S41, S42, S43, S44, and S46 in FIG. 19 correspond to steps S21, S22, S23, S24, and S25 in FIG. 12, respectively. At steps S41, S42, S43, and S46, the correlation degree calculating unit 41 calculates 24 SAD values, for example, while moving the template in the target pattern, as described above with reference to FIG. 12. Then, at step S44, the replacing unit 42 performs the interpolation process, i.e., the replacement process of replacing the defective pixel with the replacing pixel, which is the central pixel of the portion of the target pattern corresponding to the minimum of the calculated SAD values.

Then, at step S45, the replacing pixel determining unit 51 determines whether or not the level difference $\Delta Dcol\_*$ of the level of the image data of the replacing pixel from the level of the image data of the peripheral pixels is equal to or less than the third threshold $\Delta Dth$.

Specifically, the replacing pixel determining unit 51 calculates the level difference $\Delta Dcol\_*$ based on equation (3) given below with a level $Dcol\_*$ of the replacing pixel.

$$\Delta Dcol\_*=(Dcol\_*)-((T12\_*+T22\_*+T32\_*+T42\_*)/4) \quad (3)$$

Herein, T indicates the template. As illustrated in FIGS. 11A and 11B, T12 indicates the first pixel in the second line of the template. Similarly, T22 indicates the second pixel in the second line of the template, T32 indicates the third pixel in the second line of the template, and T42 indicates the fourth pixel in the second line of the template.

If having determined that the level difference $\Delta Dcol\_*$ calculated through the above-described operation is equal to or less than the third threshold $\Delta Dth$ (YES at step S45), the replacing pixel determining unit 51 directly outputs the image data of the defective pixel subjected to the interpolation process at step S44. Thereby, the process of the flowchart in FIG. 19 is completed.

If having determined that the level difference $\Delta Dcol\_*$ is greater than the third threshold $\Delta Dth$ in any of the color channels (NO at step S45), the replacing unit 42 proceeds to step S47 to perform a re-interpolation process, i.e., a replacement process of replacing the defective pixel with another replacing pixel, which is the central pixel of the portion of the target pattern corresponding to the second minimum SAD value next to the above-described minimum SAD value.

If having determined that the level difference $\Delta Dcol\_*$ of the central pixel used in the re-interpolation process is equal to or less than the third threshold $\Delta Dth$ (YES at step S45), the replacing pixel determining unit 51 outputs the image data of the defective pixel subjected to the re-interpolation process. Thereby, the process of the flowchart in FIG. 19 is completed.

If the replacing pixel determining unit 51 determines that the level difference $\Delta Dcol\_*$ of the central pixel used in the re-interpolation process is greater than the third threshold $\Delta Dth$ (NO at step S45), the replacing unit 42 performs another replacement process (step S47) to replace the defective pixel with still another replacing pixel, which is the central pixel of the portion of the target pattern corresponding to the third minimum SAD value. This re-interpolation process is repeated until it is determined that the level difference $\Delta Dcol\_*$ of the central pixel used in the re-interpolation process is equal to or less than the third threshold $\Delta Dth$.

With this configuration of the eighth embodiment, an interpolation failure due to a factor such as dust is prevented, thereby improving the accuracy of the interpolation. Further, effects similar to those of the foregoing embodiments are obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the above-described steps are not limited to the order disclosed herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A photoelectric conversion device having a plurality of photoelectric conversion pixels, the photoelectric conversion device comprising:
   circuitry configured to
      generate image data for each of a plurality of colors based on light received in the plurality of photoelectric conversion pixels;
      detect, in the plurality of photoelectric conversion pixels, a defective pixel outputting an electrical signal at an abnormal level, and store position information of the defective pixel;
      determine, after detecting the defective pixel and by the circuitry automatically executing an algorithm to analyze respective pixel values of peripheral pixels peripheral to the defective pixel, whether or not to perform an interpolation process on the defective pixel; and
      perform the interpolation process on the defective pixel when the circuitry determines, by executing the algorithm, to perform the interpolation process on the defective pixel, the interpolation process approximating the electrical signal of the defective pixel to an electrical signal at a normal level, and not perform the interpolation process on the defective pixel when the circuitry determines, by executing the algorithm, not to perform the interpolation process.

2. The photoelectric conversion device of claim 1, wherein the plurality of photoelectric conversion pixels are one-dimensionally arranged into at least one pixel row for a plurality of predetermined color channels.

3. The photoelectric conversion device of claim 2, wherein the circuitry is further configured to calculate a first difference between a maximum and a minimum of respective values of electrical signals of a plurality of left pixels adjacent to a left side of the defective signal, a first mean of the respective values of the electrical signals of the plurality of left pixels, a second difference between a maximum and a minimum of respective values of electrical signals of a plurality of right pixels adjacent to a right side of the defective signal, and a second mean of the respective values of the electrical signals of the plurality of right pixels,
   wherein when at least one of the first difference and the second difference is greater than a first threshold, the circuitry is further configured to determine not to perform the interpolation process,
   wherein when each of the first difference and the second difference is equal to or less than the first threshold and at least one of the first mean and the second mean is greater than a second threshold, the circuitry is further configured to determine not to perform the interpolation process, and
   wherein when each of the first difference and the second difference is equal to or less than the first threshold and each of the first mean and the second mean is equal to or less than the second threshold, the circuitry is further configured to determine to perform the interpolation process.

4. The photoelectric conversion device of claim 3, wherein when one of the first difference and the second difference is equal to or less than the first threshold and one of the first mean and the second mean is equal to or less than the second threshold, the circuitry is further configured to determine to perform the interpolation process.

5. The photoelectric conversion device of claim 3, further comprising a variable amplifier circuit to amplify the image data,
wherein the circuitry is further configured to determine whether to perform the interpolation process in accordance with a gain set in the variable amplifier circuit.

6. The photoelectric conversion device of claim 2, wherein when the circuitry determines to perform the interpolation process on a defective pixel in one of the plurality of predetermined color channels, the circuitry is further configured to perform the interpolation process on a pixel in any other one of the plurality of predetermined color channels corresponding to the defective pixel in the one of the predetermined color channels.

7. The photoelectric conversion device of claim 2, wherein the circuitry is further configured to
set a target pattern including a pixel row including the defective pixel, at least one pixel row preceding the pixel row including the defective pixel, and at least one pixel row following the pixel row including the defective pixel,
set a template having a size of a portion of the target pattern,
calculate a correlation degree between the template and each of portions of the target pattern while moving the template by at least one pixel after each calculation along a direction of the pixel rows from an end portion of the target pattern,
set a central pixel of a portion of the target pattern corresponding to a maximum correlation degree as a replacing pixel, and
perform the interpolation process on the defective pixel with the replacing pixel.

8. The photoelectric conversion device of claim 7, wherein when the circuitry determines that the central pixel of the portion of the target pattern corresponding to the maximum correlation degree is a defective pixel based on the stored position information of the defective pixel, the circuitry is further configured to move the template to a portion of the target pattern having a central pixel not being a defective pixel and calculate the correlation degree.

9. The photoelectric conversion device of claim 7, wherein the circuitry is further configured to determine, based on the stored position information of the defective pixel, whether the replacing pixel used in the interpolation process on the defective pixel is a defective pixel, and
wherein when the circuitry determines that the replacing pixel is a defective pixel, the circuitry is further configured to change the replacing pixel to a central pixel of a portion of the target pattern corresponding to a second maximum correlation degree, and perform the interpolation process on the defective pixel with the replacing pixel.

10. The photoelectric conversion device of claim 7, wherein the circuitry is further configured to determine whether a level difference between a level of an electrical signal of the replacing pixel and a level of respective electrical signals of peripheral pixels peripheral to the replacing pixel is equal to or less than a third threshold to determine validity of the replacing pixel,
wherein when the circuitry determines that the level difference is equal to or less than the third threshold, the circuitry is further configured to output the electrical signal generated in the replacing pixel, and
wherein when the circuitry determines that the level difference is greater than the third threshold, the circuitry is further configured to change the replacing pixel to a central pixel of a portion of the target pattern corresponding to a second maximum correlation degree, and perform the interpolation process on the defective pixel with the replacing pixel.

11. The photoelectric conversion device of claim 1, wherein, in response to supply of the electrical signal of the defective pixel, the circuitry is further configured to determine whether to perform the interpolation process based on the position information of the defective pixel, and perform the interpolation process on the electrical signal of the defective pixel based on the determination.

12. An image forming apparatus comprising the photoelectric conversion device of claim 1 to receive light reflected by a document placed on a document table.

13. The image forming apparatus of claim 12, wherein the circuitry of the photoelectric conversion device is further configured to calculate a first difference between a maximum and a minimum of respective values of electrical signals of a plurality of left pixels adjacent to a left side of the defective signal, a first mean of the respective values of the electrical signals of the plurality of left pixels, a second difference between a maximum and a minimum of respective values of electrical signals of a plurality of right pixels adjacent to a right side of the defective signal, and a second mean of the respective values of the electrical signals of the plurality of right pixels,
wherein when at least one of the first difference and the second difference is greater than a first threshold, the circuitry is further configured to determine not to perform the interpolation process,
wherein when each of the first difference and the second difference is equal to or less than the first threshold and at least one of the first mean and the second mean is greater than a second threshold, the circuitry is further configured to determine not to perform the interpolation process, and
wherein when each of the first difference and the second difference is equal to or less than the first threshold and each of the first mean and the second mean is equal to or less than the second threshold, the circuitry is further configured to determine to perform the interpolation process.

14. The image forming apparatus of claim 13, further comprising a controller to determine the first threshold and the second threshold,
wherein the photoelectric conversion device further comprises a variable amplifier circuit to amplify the image data,
wherein the circuitry is further configured to determine whether to perform the interpolation process in accordance with a gain set in the variable amplifier circuit, and
wherein the controller is further configured to change the first threshold and the second threshold in accordance with the gain set in the variable amplifier circuit.

15. The photoconversion device of claim 1, wherein the processing circuitry is further configured to determine whether or not to perform the interpolation process based on statistical calculations on the respective pixel values of the peripheral pixels.

16. A photoelectric conversion method executed by circuitry of a photoelectric conversion device having a plurality of photoelectric conversion pixels, the photoelectric conversion method comprising:
generating image data for each of a plurality of colors based on light received in the plurality of photoelectric conversion pixels;
detecting, in the plurality of photoelectric conversion pixels, a defective pixel outputting an electrical signal at an abnormal level;
storing position information of the defective pixel;
determining, after detecting the defective pixel and by the circuitry automatically executing an algorithm to analyze respective pixel values of peripheral pixels peripheral to the defective pixel, whether or not to perform an interpolation process on the defective pixel; and
performing the interpolation process on the defective pixel when the determining, by executing the algorithm, to perform the interpolation process on the defective pixel, the interpolation process approximating the electrical signal of the defective pixel to an electrical signal at a normal level, and not performing the interpolation process on the defective pixel when determining, by executing the algorithm, not to perform the interpolation process.

17. A non-transitory recording medium storing a program for causing circuitry of a photoelectric conversion device having a plurality of photoelectric conversion pixels to execute a photoelectric conversion method comprising:
generating image data for each of a plurality of colors based on light received in the plurality of photoelectric conversion pixels;
detecting, in the plurality of photoelectric conversion pixels, a defective pixel outputting an electrical signal at an abnormal level;
storing position information of the defective pixel;
determining, after detecting the defective pixel and by the circuitry automatically executing an algorithm to analyze respective pixel values of peripheral pixels peripheral to the defective pixel, whether or not to perform an interpolation process on the defective pixel; and
performing the interpolation process on the defective pixel when the determining, by executing the algorithm, to perform the interpolation process on the defective pixel, the interpolation process approximating the electrical signal of the defective pixel to an electrical signal at a normal level, and not performing the interpolation process on the defective pixel when determining, by executing the algorithm, not to perform the interpolation process.

* * * * *